US012670920B2

(12) United States Patent (10) Patent No.: US 12,670,920 B2
Eskimez et al. (45) Date of Patent: Jun. 30, 2026

(54) JOINT ACOUSTIC ECHO CANCELLATION (AEC) AND PERSONALIZED NOISE SUPPRESSION (PNS)

(71) Applicant: Microsoft Technology Licensing, LLC, Redmond, WA (US)

(72) Inventors: Sefik Emre Eskimez, Bellevue, WA (US); Takuya Yoshioka, Bellevue, WA (US); Huaming Wang, Clyde Hill, WA (US); Alex Chenzhi Ju, Seattle, WA (US); Min Tang, Redmond, WA (US); Tanel Pärnamaa, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 383 days.

(21) Appl. No.: 18/172,017

(22) Filed: Feb. 21, 2023

(65) Prior Publication Data

US 2024/0135949 A1     Apr. 25, 2024

Related U.S. Application Data

(60) Provisional application No. 63/417,182, filed on Oct. 18, 2022.

(51) Int. Cl.
G10L 21/0232 (2013.01)
G06N 3/0442 (2023.01)
(Continued)

(52) U.S. Cl.
CPC ........ G10L 21/0232 (2013.01); G06N 3/0442 (2023.01); G10L 17/02 (2013.01);
(Continued)

(58) Field of Classification Search
CPC ..... G10L 21/0232; G10L 17/02; G10L 17/04; G10L 17/06; G10L 17/18;
(Continued)

(56) References Cited

U.S. PATENT DOCUMENTS

| | | | |
|---|---|---|---|
| 11,393,487 B2 | 7/2022 | Fazeli et al. | |
| 2022/0180886 A1 | 6/2022 | Weng | |
| 2023/0403505 A1* | 12/2023 | Yu | G10L 21/02 |

FOREIGN PATENT DOCUMENTS

| | | |
|---|---|---|
| CN | 112259112 A | 1/2021 |
| CN | 112687288 A | 4/2021 |

OTHER PUBLICATIONS

G. Mittag and S. Möller, "Full-Reference Speech Quality Estimation with Attentional Siamese Neural Networks," ICASSP 2020—2020 IEEE International Conference on Acoustics, Speech and Signal Processing (ICASSP), Barcelona, Spain, 2020, pp. 346-350 (Year: 2020).*

(Continued)

*Primary Examiner* — Paras D Shah
(74) *Attorney, Agent, or Firm* — NovoTechIP International PLLC

(57) ABSTRACT

A data processing system implements receiving a far-end signal associated with a first computing device participating in an online communication session and receiving a near-end signal associated with a second computing device participating in the online communication session. The near-end signal includes speech of a target speaker, a first interfering speaker, and an echo signal. The system further implements providing the far-end signal, the near-end signal, and an indication of the target speaker as an input to a machine learning model. The machine learning model trained to analyze the far-end signal and the near-end signal to perform personalized noise suppression (PNS) to remove speech from one or more interfering speakers and acoustic echo cancellation (AEC) to remove echoes. The model is trained to output an audio signal comprising speech of the target speaker. The system obtains the audio signal comprising the speech of the target speaker from the model.

15 Claims, 11 Drawing Sheets

(51) Int. Cl.
    *G10L 17/02*      (2013.01)
    *G10L 17/04*      (2013.01)
    *G10L 17/06*      (2013.01)
    *G10L 17/18*      (2013.01)
    *G10L 21/0208*    (2013.01)
(52) U.S. Cl.
    CPC .............. *G10L 17/04* (2013.01); *G10L 17/06*
            (2013.01); *G10L 17/18* (2013.01); *G10L
                            *2021/02082* (2013.01)
(58) Field of Classification Search
    CPC ........... G10L 2021/02082; G10L 2021/02087;
                    G10L 21/0208; G06N 3/0442
    See application file for complete search history.

(56)                References Cited

OTHER PUBLICATIONS

Mendes, Andre, Julian Togelius, and Leandro dos Santos Coelho. "Multi-stage transfer learning with an application to selection process." ECAI 2020. IOS Press, 2020. 1770-1777 (Year: 2020).*

Eskimez, et al., "Real-Time Joint Personalized Speech Enhancement and Acoustic Echo Cancellation", Arxiv, May 25, 2023, 5 pages.

International Search Report and Written Opinion received for PCT Application No. PCT/US23/033316, mailed on Jan. 8, 2024, 16 pages.

Zhang et al., "Personalized Acoustic Echo Cancellation for Full-duplex Communications", Arxiv, Jun. 30, 2022, 5 pages.

Indenbom, et al., "Deep model with built-in self-attention alignment for acoustic echo cancellation", Arxiv, Aug. 24, 2022, 5 pages.

International Preliminary Report On Patentability received for PCT Application No. PCT/US23/033316, mailed on May 1, 2025, 10 pages.

Meng, et al., "Neural Echo: A Self-Attentive Recurrent Neural Network For Unified Acoustic Echo Suppression And Speech Enhancement", Arxiv, May 20, 2022, 5 pages.

Nils L, et al., "Acoustic Echo Cancellation with the Dual-Signal Transformation LSTM Network", IEEE, Jun. 6, 2021, pp. 7138-7142.

"AEC-Challenge", Retrieved from: https://github.com/microsoft/AEC-Challenge, Retrieved on Oct. 5, 2022, 4 Page.

"ITU-T P.831 : Subjective Performance Evaluation of Network Echo Cancellers", Retrieved from: https://www.itu.int/ITU-T/recommendations/rec.aspx?rec=4537&lang=en, Dec. 3, 1998, 33 Pages.

"ITU-T P.832 : Subjective Performance Evaluation of Hands-Free Terminals", Retrieved from: https://www.itu.int/ITU-T/recommendations/rec.aspx?rec=5086&lang=en, May 18, 2000, 29 Pages.

Knaderi, et al., "Microsoft / P.808", Retrieved from: https://github.com/microsoft/P.808, Retrieved on Oct. 5, 2022 5 Pages.

"Microsoft / AEC-Challenge", Retrieved from: https://github.com/microsoft/AEC-Challenge/tree/main/baseline/icassp2022, Retrieved on Oct. 5, 2022, 1 Page.

"Perceptual Evaluation of Speech Quality (PESQ): An Objective Method for End-to-End Speech Quality Assessment of Narrowband Telephone Networks and Speech Codecs", In ITU-T Recommendation P.862, Feb. 23, 2001, 30 Pages.

Hershey, et al., "Deep Clustering: Discriminative Embeddings for Segmentation and Separation", In Proceedings of IEEE International Conference on Acoustics, Speech and Signal Processing, May 19, 2016, pp. 31-35.

Karjalainen, et al., "Estimation of Modal Decay Parameters from Noisy Response Measurements", In 110th Convention of the Audio Engineering Society, May 12, 2001, pp. 867-878.

Avila, et al., "Non-intrusive Speech Quality Assessment using Neural Networks", In Proceedings of IEEE International Conference on Acoustics, Speech and Signal Processing, May 12, 2019, pp. 631-635.

Benesty, et al., "Advances in Network and Acoustic Echo Cancellation", In Proceedings of Digital Signal Processing, Jan. 2021, 232 Pages.

Farhang-Boroujeny, et al., "Adaptive Filters: Theory and Applications", In Publication of A John Wiley & Sons, Ltd., Apr. 2, 2013, 802 Pages.

Valentini-Botinhao, et al., "Speech Enhancement for a Noise-Robust Text-to-Speech Synthesis System Using Deep Recurrent Neural Networks", In Proceedings of INTERSPEECH, Sep. 2016, 5 Pages.

Braun, et al., "Towards Efficient Models for Real-Time Deep Noise Suppression", In Proceedings of the IEEE International Conference on Acoustics, Speech and Signal Processing, Jun. 6, 2021, pp. 656-660.

Bucila, et al., "Model Compression", In Proceedings of the 12th ACM SIGKDD International Conference on Knowledge Discovery and Data Mining, Aug. 20, 2006, pp. 535-541.

Casebeer, et al., "Auto-DSP: Learning to Optimize Acoustic Echo Cancellers", In Proceedings of IEEE Workshop on Applications of Signal Processing to Audio and Acoustics, Oct. 17, 2021, pp. 291-295.

Chang, et al., "DistilHuBERT: Speech Representation Learning by Layer-wise Distillation of Hidden-unit BERT", In Repository of arXiv:2110.01900v2, Oct. 6, 2021, 5 Pages.

Chen, et al., "Continuous Speech Separation with Conformer", In Proceedings of IEEE International Conference on Acoustics, Speech and Signal Processing, May 13, 2021, pp. 5749-5753.

Chen, et al., "Deep Attractor Network for Single-microphone Speaker Separation", In Proceedings of IEEE International Conference on Acoustics, Speech and Signal Processing, Mar. 5, 2017, 11 Pages.

Chen, et al., "Ultra Fast Speech Separation Model with Teacher Student Learning", In Proceedings of INTERSPEECH, Aug. 30, 2021, pp. 3026-3030.

Choi, et al., "Phase-Aware Speech Enhancement with Deep Complex U-Net", In Proceedings of International Conference on Learning Representations, Mar. 7, 2019, 20 Pages.

Yamagishi, et al., "CSTR VCTK Corpus: English Multi-speaker Corpus for CSTR Voice Cloning Toolkit", Retrieved From: https://datashare.ed.ac.uk/handle/10283/3443, Nov. 13, 2019, 2 Pages.

Chung, et al., "Empirical Evaluation of Gated Recurrent Neural Networks on Sequence Modeling", In Repository of arXiv:1412.3555, Dec. 11, 2014, 9 Pages.

Clevert, et al., "Fast and Accurate Deep Network Learning by Exponential Linear Units (ELUs)", In Repository of arXiv:1511.07289v2, Dec. 3, 2015, 14 Pages.

Cui, et al., "Multi-Scale Refinement Network Based Acoustic Echo Cancellation", In Proceedings of the IEEE International Conference on Acoustics, Speech and Signal Processing, May 23, 2022, pp. 9132-9136.

Cutler, et al., "Crowdsourcing Approach for Subjective Evaluation of Echo Impairment", In Proceedings of IEEE International Conference on Acoustics, Speech and Signal Processing, Jun. 6, 2021, pp. 406-410.

Cutler, et al., "ICASSP 2022 Acoustic Echo Cancellation Challenge", In Repository of arXiv:2202.13290v1, Feb. 27, 2022, 5 Pages.

Cutler, et al., "INTERSPEECH 2021 Acoustic Echo Cancellation Challenge", In Proceedings of INTERSPEECH, Jun. 2021, 5 Pages.

Delcroix, et al., "Single Channel Target Speaker Extraction and Recognition with Speaker Beam", In Proceedings of IEEE International Conference on Acoustics, Speech and Signal Processing, Sep. 13, 2018, pp. 5554-5558.

Dubey, et al., "ICASSP 2022 Deep Noise Suppression Challenge", In Proceedings of IEEE International Conference on Acoustics, Speech and Signal Processing, Apr. 27, 2022, pp. 9271-9275.

Eneman, et al., "Iterated Partitioned Block Frequency-Domain Adaptive Filtering for Acoustic Echo Cancellation", In IEEE Transactions on Speech and Audio Processing, vol. 11, Issue 2, Mar. 2003, pp. 143-158.

(56) References Cited

OTHER PUBLICATIONS

Enzner, et al., "Acoustic Echo Control", In Proceedings of the Academic Press Library in Signal Processing, Jan. 1, 2014, pp. 807-877.

Ephrat, et al., "Looking to Listen at the Cocktail Party: A Speaker-Independent Audio-Visual Model for Speech Separation", In the Journal of ACM Transactions on Graphics, vol. 37, Issue 4, Aug. 2018, 11 Pages.

Eskimez, et al., "Human Listening and Live Captioning: Multi-Task Training for Speech Enhancement", In Proceedings of INTERSPEECH, Aug. 30, 2021, pp. 2686-2690.

Eskimez, et al., "Personalized Speech Enhancement: New Models and Comprehensive Evaluation", In Proceedings of IEEE International Conference on Acoustics, Speech and Signal Processing, Apr. 27, 2022, pp. 356-360.

Fazel, et al., "CAD-AEC: Context-Aware Deep Acoustic Echo Cancellation", In Proceedings of IEEE International Conference on Acoustics, Speech and Signal Processing, May 4, 2020, pp. 6919-6923.

Fonseca, et al., "Freesound Datasets: A Platform for the Creation of Open Audio Datasets", In Proceedings of the 18th ISMIR Conference, Oct. 23, 2017, pp. 486-493.

Furlanello, et al., "Born Again Neural Networks", In Proceedings of the International Conference on Machine Learning, Jul. 3, 2018, 10 Pages.

Gamper, et al., "Blind Reverberation Time Estimation Using a Convolutional Neural Network", In Proceedings of 16th International Workshop on Acoustic Signal Enhancement, Sep. 2018, pp. 136-140.

Gamper, et al., "Intrusive and Non-Intrusive Perceptual Speech Quality Assessment Using a Convolutional Neural Network", In Proceedings of IEEE Workshop on Applications of Signal Processing to Audio and Acoustics, Oct. 20, 2019, pp. 85-89.

Garofolo, et al., "DARPA TIMIT: Acoustic-Phonetic Continuous Speech Corpus CD-ROM", In NIST Speech Disc, Feb. 1993, 94 Pages.

Gemmeke, et al., "Audio Set: An Ontology and Human-labeled Dataset for Audio Events", In Proceedings of IEEE International Conference on Acoustics, Speech and Signal Processing, Jun. 19, 2017, pp. 776-780.

Giri, et al., "Personalized PercepNet: Real-time, Low-complexity Target Voice Separation and Enhancement", In Proceedings of INTERSPEECH, Aug. 30, 2021, pp. 1124-1128.

Gulati, et al., "Conformer: Convolution-augmented Transformer for Speech Recognition", In Repository of arXiv:2005.08100v1, May 16, 2020, 5 Pages.

Halimeh, et al., "Efficient Multichannel Nonlinear Acoustic Echo Cancellation Based on a Cooperative Strategy", In Proceedings of IEEE International Conference on Acoustics, Speech and Signal Processing, May 4, 2020, pp. 461-465.

Hao, et al., "SNR-Based Teachers-Student Technique for Speech Enhancement", In Repository of arXiv:2005.14441v2, Oct. 29, 2020, 6 Pages.

Aggarwal, et al., "1329-1999—IEEE Standard Method for Measuring Transmission Performance of Handsfree Telephone Sets", In Proceedings of IEEE, May 2, 2000, 94 Pages.

Hinton, et al., "Distilling the Knowledge in a Neural Network", In Repository of arXiv:1503.02531v1, Mar. 9, 2015, 9 Pages.

Hochreiter, et al., "Long Short-Term Memory", In Journal of Neural Computation, vol. 9, Issue 8, Nov. 15, 1997, pp. 1735-1780.

Hu, et al., "DCCRN: Deep Complex Convolution Recurrent Network for Phase-Aware Speech Enhancement", In Repository of arXiv:2008.00264v1, Aug. 1, 2020, 5 Pages.

Ianniello, John P., "Time Delay Estimation Via Cross-Correlation in the Presence of Large Estimation Errors", In Journal of IEEE Transactions on Acoustics, Speech, and Signal Processing, vol. 30, Issue 6, Dec. 6, 1982, pp. 998-1003.

Indenbom, et al., "Deep Model with Built-in Self-Attention Alignment for Acoustic Echo Cancellation", In Repository of arXiv:2208.11308v1, Aug. 24, 2022, 5 Pages.

Isik, et al., "Single-Channel Multi-Speaker Separation using Deep Clustering", In Proceedings of INTERSPEECH, Sep. 8, 2016, pp. 545-549.

What is Project Acoustics?, Retrieved From: https://web.archive.org/web/20220303165340/https://docs.microsoft.com/en-us/gaming/acoustics/what-is-acoustics, Apr. 26, 2021, 6 Pages.

Kim, et al., "Attention Wave-U-Net for Acoustic Echo Cancellation", In Proceedings of INTERSPEECH, Oct. 25, 2020, pp. 3969-3973.

Kim, et al., "Test-Time Adaptation Toward Personalized Speech Enhancement: Zero-Shot Learning with Knowledge Distillation", In Proceedings of IEEE Workshop on Applications of Signal Processing to Audio and Acoustics, Oct. 17, 2021, pp. 176-180.

Kingma, et al., "ADAM: A Method for Stochastic Optimization", In Proceedings of 3rd International Conference on Learning Representations, May 7, 2015, 15 Pages.

Kobayashi, et al., "Implementation of Low-Latency Electrolaryngeal Speech Enhancement Based on Multi-Task CLDNN", In Proceedings of 28th European Signal Processing Conference, Jan. 18, 2021, pp. 396-400.

Lee, et al., "DNN-Based Residual Echo Suppression", In Proceedings of the Sixteenth Annual Conference of the International Speech Communication Association, Sep. 6, 2015, pp. 1775-1779.

Lin, et al., "A Low-Complexity Adaptive Echo Canceller for xDSL Applications", In Journal of IEEE Transactions on Signal Processing, vol. 52, Issue 5, May 5, 2004, pp. 1461-1465.

Luo, et al., "Conv-TasNet: Surpassing Ideal Time-Frequency Magnitude Masking for Speech Separation", In Journal of IEEE/ACM Transactions on Audio, Speech, and Language Processing, vol. 27, Issue 8, May 6, 2019, pp. 1256-1266.

Ma, et al., "Acoustic Echo Cancellation by Combining Adaptive Digital Filter and Recurrent Neural Network", In Repository of arXiv:2005.09237v1, May 19, 2020, 5 Pages.

Ma, et al., "EchoFilter: End-to-End Neural Network for Acoustic Echo Cancellation", In Repository of arXiv:2105.14666v1, May 31, 2021, 5 Pages.

Naderi, et al., "An Open Source Implementation of ITU-T Recommendation P.808 with Validation", In Proceedings of INTERSPEECH, Oct. 25, 2020, pp. 2862-2866.

Naderi, et al., "Subjective Evaluation of Noise Suppression Algorithms in Crowdsourcing", In Proceedings of INTERSPEECH, Aug. 30, 2021, pp. 2132-2136.

Pandey, et al., "Dense CNN With Self-Attention for Time-Domain Speech Enhancement", In Proceedings of IEEE/ACM Transactions on Audio, Speech, and Language Processing, Mar. 8, 2021, pp. 1270-1279.

De, et al., "Impact of Digital Surge During Covid-19 Pandemic: A Viewpoint on Research and Practice", In Journal of Information Management, vol. 55, Jun. 9, 2020, 5 Pages.

Peng, et al., "ICASSP 2021 Acoustic Echo Cancellation Challenge: Integrated Adaptive Echo Cancellation with Time Alignment and Deep Learning-Based Residual Echo Plus Noise Suppression", In Proceedings of IEEE International Conference on Acoustics, Speech and Signal Processing, Jun. 6, 2021, pp. 146-150.

Peng, et al., "Shrinking Bigfoot: Reducing Wav2vec 2.0 Footprint", In Repository of arXiv:2103.15760v2, Apr. 1, 2021, 5 Pages.

Purin, et al., "AECMOS: A speech Quality Assessment Metric for Echo Impairment", In Repository of arXiv:2110.03010v2, Oct. 8, 2021, 5 Pages.

Reddy, et al., "DNSMOS P.835: A Non-Intrusive Perceptual Objective Speech Quality Metric to Evaluate Noise Suppressors", In Repository of arXiv:2110.01763v4, Feb. 4, 2022, 5 Pages.

Reddy, et al., "INTERSPEECH 2021 Deep Noise Suppression Challenge", In Repository of arXiv:2101.01902v3, Apr. 5, 2021, 5 Pages.

Reddy, et al., "The INTERSPEECH Deep Noise Suppression Challenge: Datasets, Subjective Testing Framework, and Challenge Results", In Proceedings of INTERSPEECH, Oct. 25, 2020, pp. 2492-2496.

Sanh, et al., "DistilBERT, A Distilled Version of BERT: Smaller, Faster, Cheaper and Lighter", In Repository of arXiv:1910.01108v1, Oct. 2, 2019, 5 Pages.

(56)         References Cited

OTHER PUBLICATIONS

Sato, et al., "Should We Always Separate ?: Switching Between Enhanced and Observed Signals for Overlapping Speech Recognition", In Proceedings of INTERSPEECH, Aug. 30, 2021, pp. 1149-1153.
Seo, et al., "Shortcut Connections based Deep Speaker Embeddings for End-to-End Speaker Verification System", In Proceedings of INTERSPEECH System, vol. 13, No. 15, Sep. 15, 2019, pp. 2928-2932.
Sivaraman, et al., "Personalized Speech Enhancement through Self-Supervised Data Augmentation and Purification", In Proceedings of INTERSPEECH, Aug. 30, 2021, pp. 2676-2680.
Sridhar, et al., "ICASSP 2021 Acoustic Echo Cancellation Challenge: Datasets, Testing Framework, and Results", In Proceedings of the IEEE International Conference on Acoustics, Speech and Signal Processing, Jun. 6, 2021, pp. 151-155.
Sun, et al., "Explore Relative and Context Information with Transformer for Joint Acoustic Echo Cancellation and Speech Enhancement", In Proceedings of the IEEE International Conference on Acoustics, Speech and Signal Processing, May 23, 2022, pp. 9117-9121.
Taal, et al., "An Algorithm for Intelligibility Prediction of Time-Frequency Weighted Noisy Speech", In Proceedings of IEEE Transactions on Audio, Speech, and Language Processing, vol. 19, No. 7, Sep. 2011, pp. 2125-2136.
Taherian, et al., "One Model to Enhance Them All: Array Geometry Agnostic Multi-Channel Personalized Speech Enhancement", In Proceedings of IEEE International Conference on Acoustics, Speech and Signal Processing, Apr. 27, 2022, pp. 271-275.
Thakker, et al., "Fast Real-time Personalized Speech Enhancement: End-to-End Enhancement Network (E3Net) and Knowledge Distillation", In Repository of arXiv:2204.00771v1, Apr. 2, 2022, 5 Pages.
Thiemann, et al., "The Diverse Environments Multi-channel Acoustic Noise Database (DEMAND): A Database of Multichannel Environmental Noise Recordings", In Journal of of Meetings on Acoustics ICA2013, vol. 19, Issue 1, Jun. 2, 2013, 7 Pages.
Turc, et al., "Well-Read Students Learn Better: On the Importance of Pre-training Compact Models", In Repository of arXiv:1908.08962v2, Sep. 25, 2019, 13 Pages.
Vaswani, et al., "Attention is All you Need", In Proceedings of Advances in Neural Information Processing Systems, 2017, 11 Pages.
Wang, et al., "Knowledge Distillation and Student-Teacher Learning for Visual Intelligence: A Review and New Outlooks", In Proceedings of IEEE Transactions on Pattern Analysis and Machine Intelligence, vol. 44, Issue 6, Jun. 2022, pp. 3048-3068.
Wang, et al., "Transformer-Based Acoustic Modeling for Hybrid Speech Recognition", In Proceedings of IEEE International Conference on Acoustics, Speech and Signal Processing, Apr. 9, 2020, pp. 6874-6878.
Wang, et al., "VoiceFilter: Targeted Voice Separation by Speaker-Conditioned Spectrogram Masking", In Proceedings of INTERSPEECH, Sep. 15, 2019, pp. 2728-2732.
Wang, et al., "VoiceFilter-Lite: Streaming Targeted Voice Separation for On-Device Speech Recognition", In Proceedings of INTERSPEECH, Oct. 25, 2020, pp. 2677-2681.
Watcharasupat, et al., "End-to-End Complex-Valued Multidilated Convolutional Neural Network for Joint Acoustic Echo Cancellation and Noise Suppression", In Repository of arXiv:2110.00745v2, Oct. 11, 2021, 5 Pages.

Westhausen, et al., "Acoustic Echo Cancellation with the Dual-Signal Transformation LSTM Network", In Proceedings of the IEEE International Conference on Acoustics, Speech and Signal Processing, Jun. 6, 2021, pp. 7138-7142.
Williamson, et al., "Complex Ratio Masking for Monaural Speech Separation", In Proceedings of IEEE/ACM Transactions on Audio, Speech, and Language Processing, vol. 24, No. 3, Mar. 2016, pp. 483-492.
Wisdom, et al., "Differentiable Consistency Constraints for Improved Deep Speech Enhancement", In Proceedings of the ICASSP IEEE International Conference on Acoustics, Speech and Signal Processing, May 12, 2019, pp. 900-904.
Xia, et al., "Weighted Speech Distortion Losses for Neural-Network-Based Real-Time Speech Enhancement", In Proceedings of IEEE International Conference on Acoustics, Speech and Signal Processing, May 4, 2020, pp. 871-875.
Xiao, et al., "Single-channel Speech Extraction Using Speaker Inventory and Attention Network", In Proceedings of IEEE International Conference on Acoustics, Speech and Signal Processing, Apr. 17, 2019, pp. 86-90.
Xu, et al., "Can Model Compression Improve NLP Fairness?", In Repository of arXiv:2201.08542v1, Jan. 21, 2022, 9 Pages.
Yin, et al., "PHASEN: A Phase-and-Harmonics-Aware Speech Enhancement Network", In Proceedings of the AAAI Conference on Artificial Intelligence, vol. 34, No. 05, Apr. 3, 2020, pp. 9458-9465.
Yu, et al., "NeuralEcho: A Self-Attentive Recurrent Neural Network For Unified Acoustic Echo Suppression and Speech Enhancement", In Repository of arXiv:2205.10401v1, May 20, 2022, 5 Pages.
Zhang, et al., "A Deep Learning Approach to Multi-Channel and Multi-Microphone Acoustic Echo Cancellation", In Proceedings of INTERSPEECH, Aug. 30, 2021, pp. 1139-1143.
Zhang, et al., "A Robust and Cascaded Acoustic Echo Cancellation Based on Deep Learning", In Proceedings of INTERSPEECH, Oct. 25, 2020, pp. 3940-3944.
Zhang, et al., "Be Your Own Teacher: Improve the Performance of Convolutional Neural Networks via Self Distillation", In Proceedings of the IEEE/CVF International Conference on Computer Vision, Nov. 2, 2019, pp. 3713-3722.
Zhang, et al., "Deep Learning for Joint Acoustic Echo and Noise Cancellation with Nonlinear Distortions", In Proceedings of INTERSPEECH, Sep. 15, 2019, pp. 4255-4259.
Zhang, et al., "Multi-Scale Temporal Frequency Convolutional Network With Axial Attention for Speech Enhancement", In Proceedings of IEEE International Conference on Acoustics, Speech and Signal Processing, May 23, 2022, pp. 9122-9126.
Zhang, et al., "Multi-Task Deep Residual Echo Suppression with Echo-Aware Loss", In Proceedings of the IEEE International Conference on Acoustics, Speech and Signal Processing, May 23, 2022, pp. 9127-9131.
Zhao, et al., "A Deep Hierarchical Fusion Network for Fullband Acoustic Echo Cancellation", In Proceedings of the IEEE International Conference on Acoustics, Speech and Signal Processing, May 23, 2022, pp. 9112-9116.
Zhou, et al., "ResNext and Res2Net Structures for Speaker Verification", In Proceedings of IEEE Spoken Language Technology Workshop, Mar. 25, 2021, pp. 301-307.
"ITU-T P.808 : Subjective Evaluation of Speech Quality with a Crowdsourcing Approach", Retrieved from: https://www.itu.int/itu-t/recommendations/rec.aspx?rec=13625&lang=en, Jun. 13, 2018, 28 Pages.

* cited by examiner

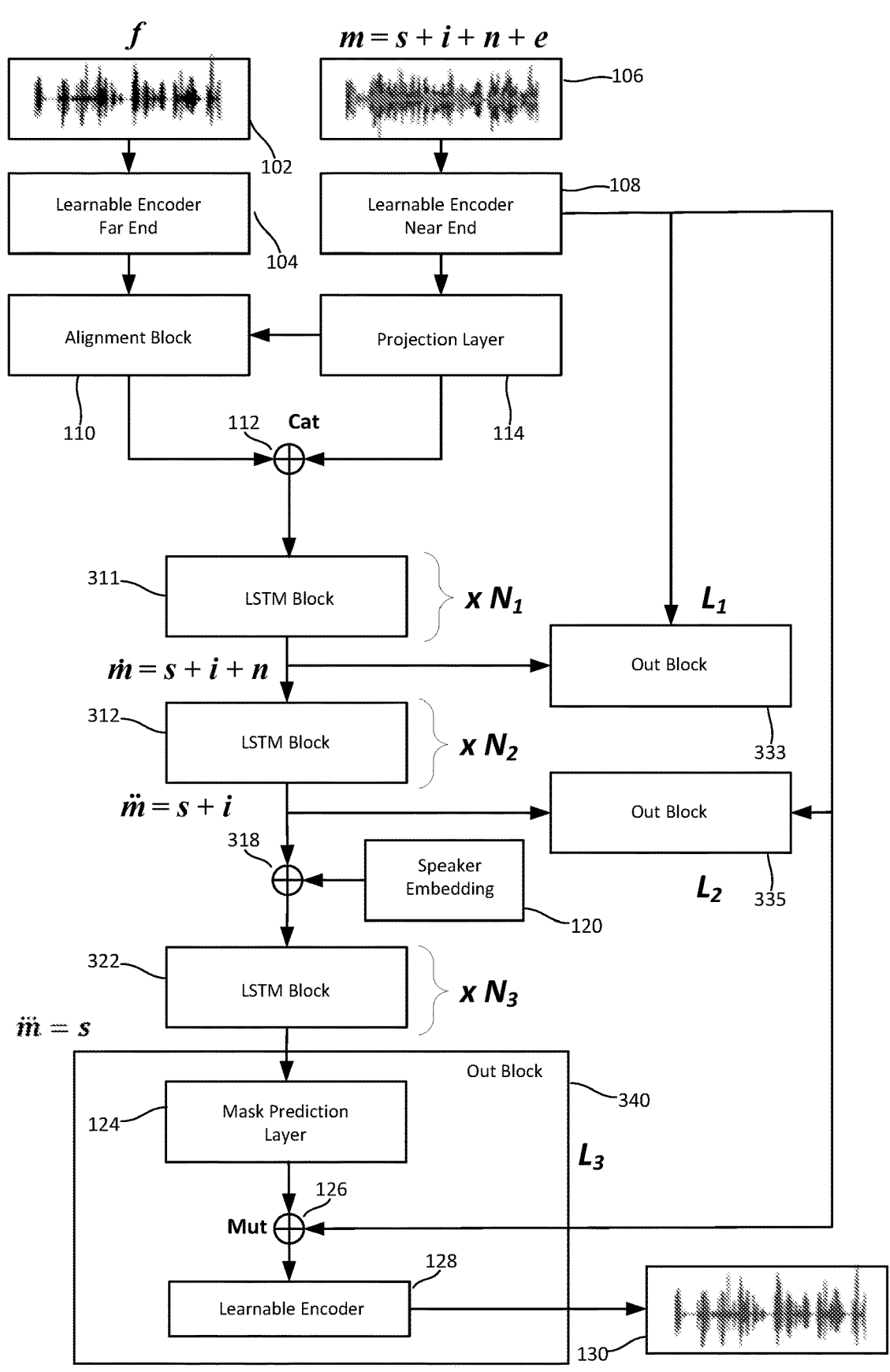
FIG. 3     $L = w_1 L_1 + w_2 L_2 + w_3 L_3$ s1 + s2 + s3 + noise ⟋402 s1 + s2 + s3 ⟋406

404

--- s1 + s2 + s3 + noise ⟋408 s1 ⟋412

414

--- s1 + s2 + s3 + noise ⟋416 s1 + s2 ⟋420

422

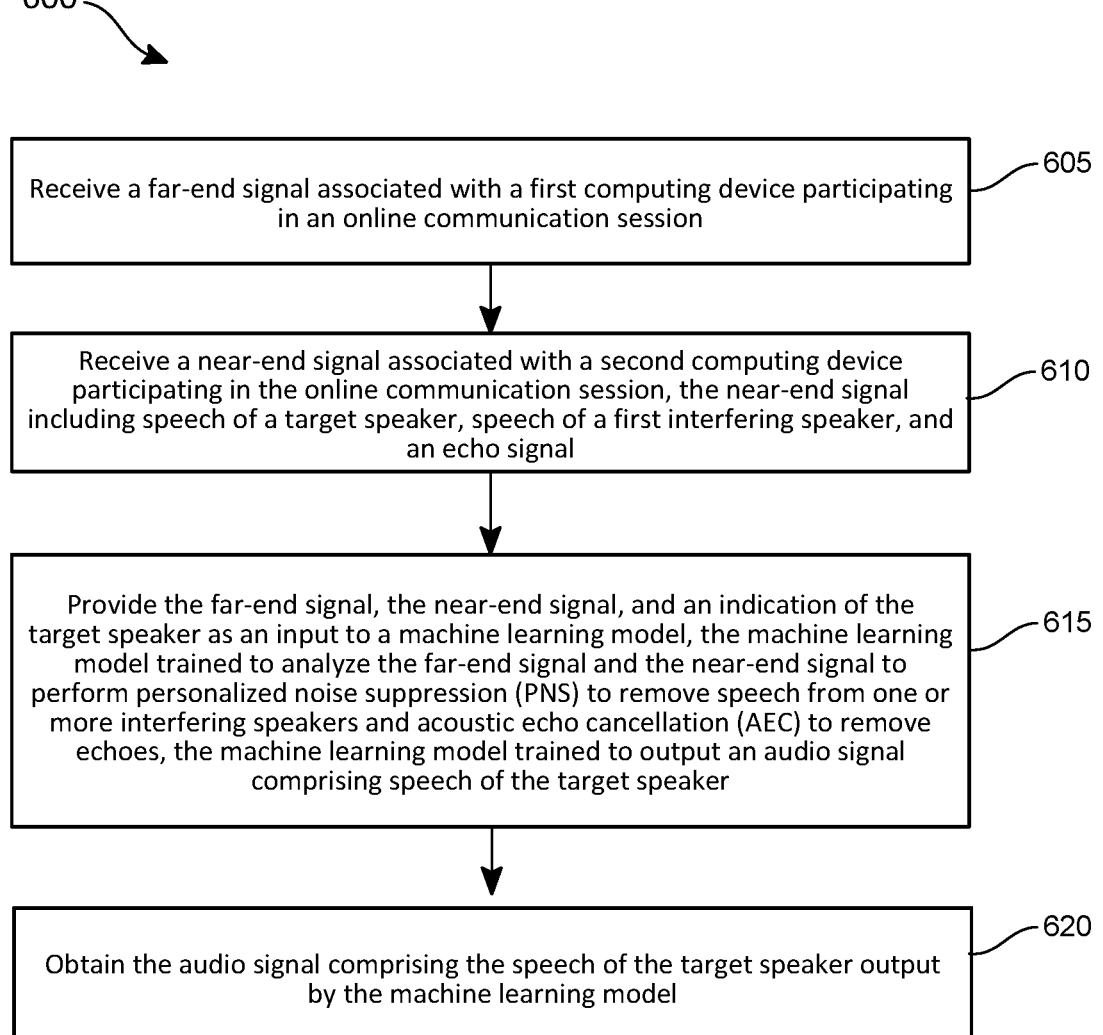

600

Receive a far-end signal associated with a first computing device participating in an online communication session                                                     605

Receive a near-end signal associated with a second computing device participating in the online communication session, the near-end signal including speech of a target speaker, speech of a first interfering speaker, and an echo signal                                                     610

Provide the far-end signal, the near-end signal, and an indication of the target speaker as an input to a machine learning model, the machine learning model trained to analyze the far-end signal and the near-end signal to perform personalized noise suppression (PNS) to remove speech from one or more interfering speakers and acoustic echo cancellation (AEC) to remove echoes, the machine learning model trained to output an audio signal comprising speech of the target speaker                                                     615

Obtain the audio signal comprising the speech of the target speaker output by the machine learning model                                                     620

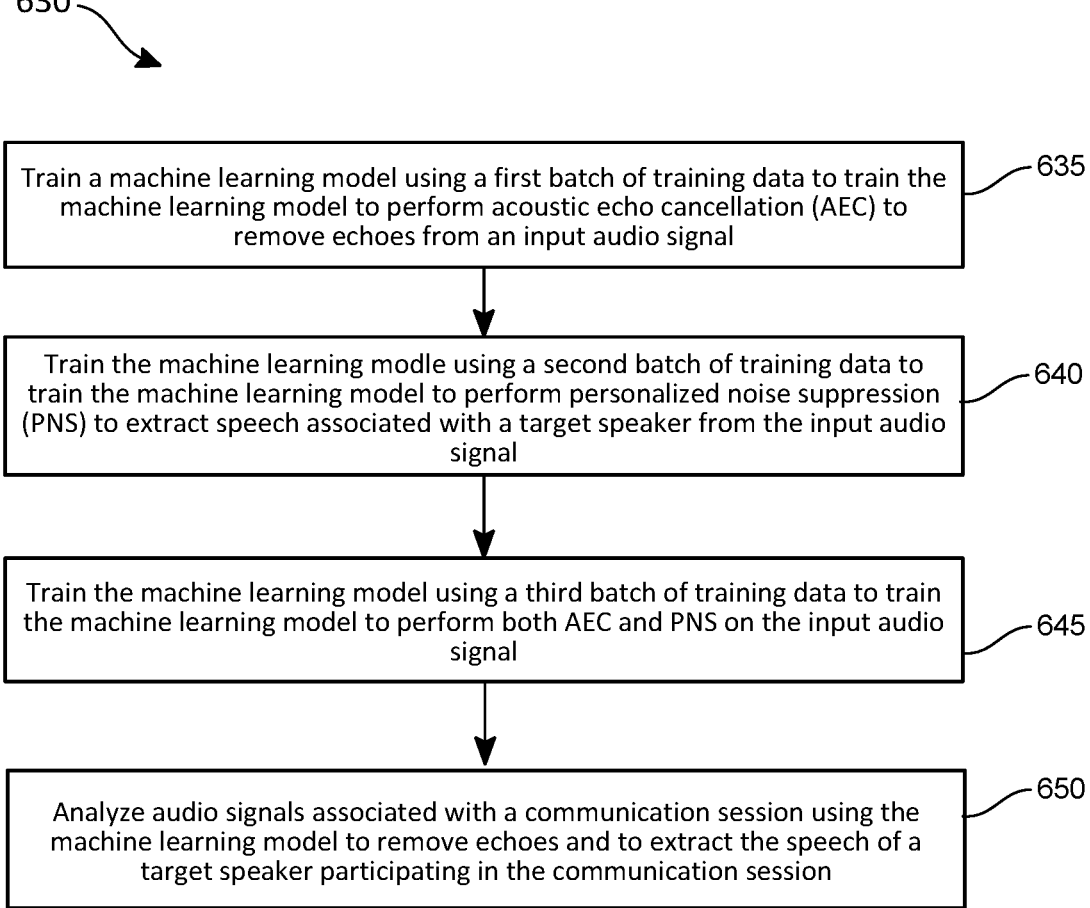

Train a machine learning model using a first batch of training data to train the machine learning model to perform acoustic echo cancellation (AEC) to remove echoes from an input audio signal ⟋635

Train the machine learning modle using a second batch of training data to train the machine learning model to perform personalized noise suppression (PNS) to extract speech associated with a target speaker from the input audio signal ⟋640

Train the machine learning model using a third batch of training data to train the machine learning model to perform both AEC and PNS on the input audio signal ⟋645

Analyze audio signals associated with a communication session using the machine learning model to remove echoes and to extract the speech of a target speaker participating in the communication session ⟋650

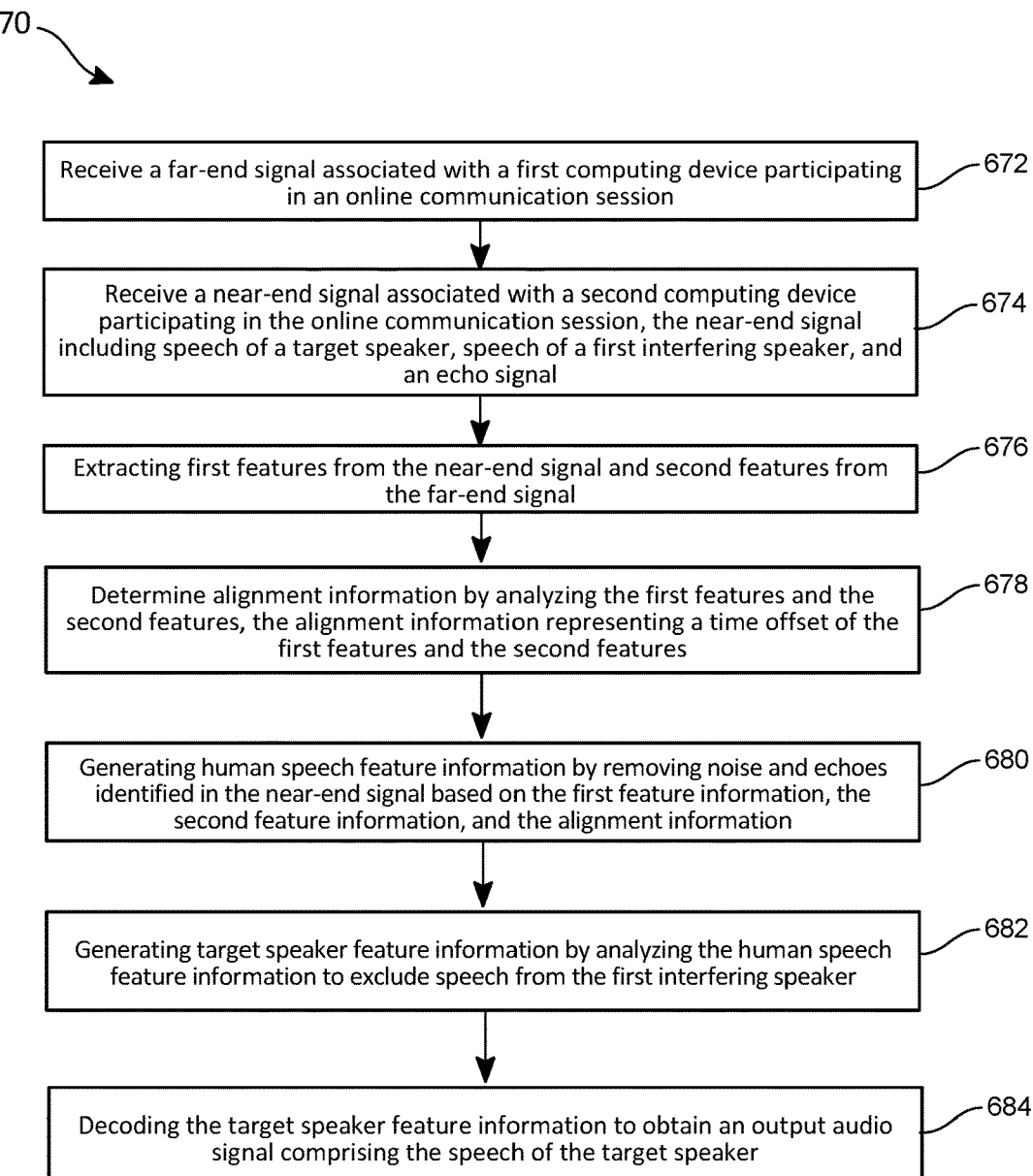

Receive a far-end signal associated with a first computing device participating in an online communication session ⟋672

Receive a near-end signal associated with a second computing device participating in the online communication session, the near-end signal including speech of a target speaker, speech of a first interfering speaker, and an echo signal ⟋674

Extracting first features from the near-end signal and second features from the far-end signal ⟋676

Determine alignment information by analyzing the first features and the second features, the alignment information representing a time offset of the first features and the second features ⟋678

Generating human speech feature information by removing noise and echoes identified in the near-end signal based on the first feature information, the second feature information, and the alignment information ⟋680

Generating target speaker feature information by analyzing the human speech feature information to exclude speech from the first interfering speaker ⟋682

Decoding the target speaker feature information to obtain an output audio signal comprising the speech of the target speaker ⟋684

FIG. 6C

JOINT ACOUSTIC ECHO CANCELLATION (AEC) AND PERSONALIZED NOISE SUPPRESSION (PNS)

BACKGROUND

Online audio and/or video conferencing platforms have become an important tool for facilitating communications. Enterprises have increasingly relied on such communications platforms as more employees work from home or other remote locations. Audio quality is critical for such platforms. However, acoustic echoes and background noise can degrade the audio quality of the signals.

Acoustic echoes occur a first participant of an audio or video conference, referred to herein as a far-end user, hears an echo of their voice in the audio content captured by the computing device of a second participant of the audio or video conference, referred to herein as a near-end user. The computing device of the far-end user captures a first audio stream, which includes the speech of the far-end user. The first audio stream is sent to the computing device of the near-end user and the audio content of the first audio stream is output by a loudspeaker associated with the computing device of the near-end user. A microphone associated with the computing-device of the near-end user captures a second audio stream, which includes the speech of the near-end user but also captures the speech of the far-end user included in the first audio stream which is output by the loudspeaker of the computing device of the near-end user. As a result, the second audio stream provided to the computing device of the far-end user includes a delayed copy of the speech of the far-end user. As the computing device of the far-end user outputs the second audio stream, the far-end user hears an echo of their voice output by their computing device. The echoes are delayed by the round-trip time of the signal to travel from the computing device of the far-end user to the computing device of the near-end user and back again. Such echoes in the audio signal will be distracting for speakers and degrade the overall user experience.

Background noise at the locations of both the near-end and far-end users can also negatively impact audio quality of a communication session. Such background noise may also include speech from other people, and the speech processing models used by the communication platforms struggle to discriminate a user's speech from the speech of other people present at that location. Unconditional Speech Enhancement (SE) models provide one solution for removing background noise and keeping only the speech from a noisy audio signal. However, unconditional SE models fail to discriminate between the voices of the user participating in a communication session and other speakers who are in the background. Consequently, such models keep all speaker's voices in the audio stream regardless of whether the speaker was a user participating in the communication session or someone whose speech was inadvertently captured from the background. With more users working from home or other locations where people who are unrelated to an enterprise are likely to be present, inadvertently capturing the speech of other people present at the location of the user participating in the communication session can lead to unintended privacy issues. Hence, there is a need for improved systems and methods that provide a technical solution for suppressing echo and background noise in communications systems.

SUMMARY

An example data processing system according to the disclosure may include a processor and a machine-readable medium storing executable instructions. The instructions when executed cause the processor to perform operations including receiving a far-end signal associated with a first computing device participating in an online communication session; receiving a near-end signal associated with a second computing device participating in the online communication session, the near-end signal including speech of a target speaker, a first interfering speaker, and an echo signal; providing the far-end signal, the near-end signal, and an indication of the target speaker as an input to a machine learning model, the machine learning model trained to analyze the far-end signal and the near-end signal to perform personalized noise suppression (PNS) to remove speech from one or more interfering speakers and acoustic echo cancellation (AEC) to remove echoes, the machine learning model trained to output an audio signal comprising speech of the target speaker; and obtaining the audio signal comprising the speech of the target speaker.

An example method implemented in a data processing system for processing audio signals includes receiving a far-end signal associated with a first computing device participating in an online communication session; receiving a near-end signal associated with a second computing device participating in the online communication session, the near-end signal including speech of a target speaker, a first interfering speaker, and an echo signal; providing the far-end signal, the near-end signal, and an indication of the target speaker as an input to a machine learning model, the machine learning model trained to analyze the far-end signal and the near-end signal to perform personalized noise suppression (PNS) to remove speech from one or more interfering speakers and acoustic echo cancellation (AEC) to remove echoes, the machine learning model trained to output an audio signal comprising speech of the target speaker; and obtaining the audio signal comprising the speech of the target speaker.

An example data processing system according to the disclosure may include a processor and a machine-readable medium storing executable instructions. The instructions when executed cause the processor to perform operations including training a machine learning model using a first batch of training data to train the machine learning model to perform acoustic echo cancellation (AEC) to remove echoes from an input audio signal; training the machine learning model using a second batch of training data to train the machine learning model to perform personalized noise suppression (PNS) to extract speech associated with a target speaker from the input audio signal; training the machine learning model using a third batch of training data to train the machine learning model to perform both AEC and PNS on the input audio signal; and analyzing audio signals associated with a communication session using the machine learning model to remove echoes and to extract the speech of a target speaker participating in the communication session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is a diagram showing an alternative example implementation of the Joint AEC and PNS model shown in the preceding figures.

FIG. 6A is a flow chart of an example process for processing audio signals according to the techniques disclosed herein.

FIG. 6B is a flow chart of an example process for training a joint AEC and PNS model for processing audio signals according to the techniques disclosed herein.

FIG. 6C is a flow chart of another example process for processing audio signals.

DETAILED DESCRIPTION

Techniques for joint acoustic echo cancellation (AEC) and personalized noise suppression (PNS) are provided. These techniques address the technical problems associated with removing echoes and background noise including other voices from an audio signal. These techniques utilize a machine learning model trained to provide both AEC and PNS, in contrast to current models which can provide either AEC or PNS, but not both. The model achieves both AEC and PNS by extracting a speaker embedding vector for each user from user enrollment data. The speaker embedding vector is used to filter all other audio sources from an audio signal. This approach provides several technical benefits. The small model size significantly reduces the amount of computing and memory resources required to implement an instance of the model and allows for real-time processing of audio signals necessary for full-duplex communications. Furthermore, this approach does not require that a model be trained for each user. The model is instead trained using a training dataset that includes many speakers, which enables the model to perform well even for speakers not included in the training dataset. The model merely requires a small amount of audio data, referred to as enrollment data, from a user during the inference stage to achieve personalization for that user. These and other technical benefits of the techniques disclosed herein will be evident from the discussion of the example implementations that follow.

Figure 1:
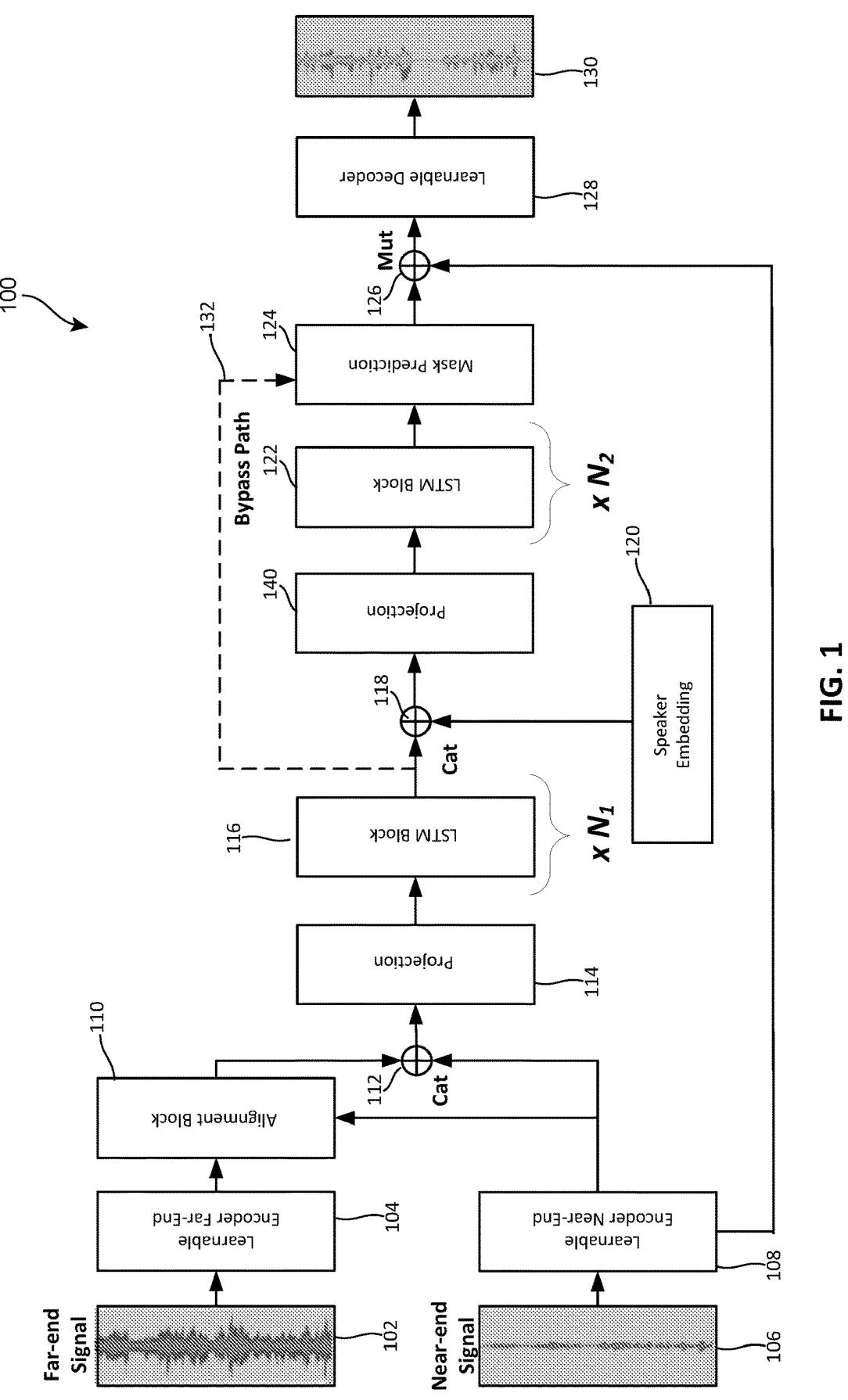
FIG. 1 is a diagram showing an example implementation of a Joint Acoustic Echo Cancellation (AEC) and Personalized Noise Suppression (PNS) model.

FIG. 1 is a diagram showing an example implementation of a Joint Acoustic Echo Cancellation (AEC) and Personalized Noise Suppression (PNS) model 100. AEC removes echoes from audio signals, while PNS estimates clean target speech signals for a target speaker or speakers. A target speaker is a speaker whose voice is captured in a microphone signal and whose speech is to be extracted from the microphone signal. The microphone signal may include the speech of one or more interfering speakers. An interfering speaker is another person who is present in the same environment as the target speaker and whose speech has also been captured in the microphone signal and interferes with the extraction of the speech of the target speaker. A limitation of current AEC models is that these models preserve all of the speech of all of the speakers present in the microphone signal, including interfering speakers. This can present privacy issues by including the speech of interfering speakers in the signal output by the AEC models. The interfering speakers present in the environment with the target speaker or speakers may not be participating in an online meeting or other audio and/or video communication session in which the target speaker is participating. The interfering speakers may not be aware that their speech has been captured by the computing device of the target speaker.

The model 100 generates clean target speech signals that have background noise and speech of interfering speakers removed. The model 100 overcomes shortcomings of current PNS systems, which lack AEC capability. However, AEC is critical for full-duplex communications platforms, such as audio and/or video communications platforms, where echoes in the audio signal will significantly degrade the user experience. In contrast with general noise suppression systems and PNS systems, echo cancellation systems accept an additional input called the "far-end signal" which is an audio captured at a remote computing device at the other end of a communication with a near-end device. Echoes represent various artefacts, including distortions, time delays, and reverberations, which may be introduced into the far-end signal. AEC utilizes the far-end signal to help identify these artefacts and to remove them from the mixture audio signal, which includes both near-end and far-end signal information. The architecture of the model 100 provided herein is optimized to facilitate joint PNS and AEC training in contrast with current models which are trained to perform either PNS or AEC. Consequently, the model 100 provides significant improvements over current models in joint PNS-AEC use cases.

In some implementations, architecture of the model 100 is based on an existing PNS system referred to as E3Net, which is described in detail in the paper "Fast Real-time Personalized Speech Enhancement: End-to-End Enhancement Network (E3Net) and Knowledge Distillation" by Thakker and Eskimez, et al., which is incorporated herein by reference. However, the architecture of the model 100 includes a learnable encoder 104 for the far-end signal 102 and an alignment block 110 which are not found in the E3Net architecture.

In the example implementation shown in FIG. 1, the far-end signal 102 is a raw wave form obtained by a microphone of a computing device of a user located at a remote location, referred (i.e., the far-end user). The far-end signal 102 is typically received over a network connection, which introduces time delay. The far-end signal 102 may also include other echo-related artefacts, such as distortions and reverberations. The model 100 is configured to employ AEC to remove these echo-related artefacts, as discussed below.

The far-end signal 102 is provided as an input to the learnable encoder 104. The learnable encoder 104 replaces the short-time Fourier Transform (STFT) features commonly used in audio signal processing systems with learnable features. The learnable encoder 104 is configured to receive the raw audio waveform of the far-end signal 102 as an input and to output embeddings representing features of the raw audio waveform. In some implementations, the learnable encoder 104 is implemented as a one-dimensional (1D) convolutional layer that is configured to extract linear features from the far-end signal 102. In some implementations, the filter and stride sizes of the learnable encoder 104 are equal to the window and hop sizes of a typical STFT configuration to reduce the computational costs associated with encoding of the far-end signal 102. The features output by the learnable encoder 104 are provided as an input to the alignment block 110.

The near-end signal 106 is an audio signal obtained by a microphone of a local computing device. The local computing device may be a teleconferencing device including one or more microphones and one or more speakers, a laptop or desktop computer, a tablet computer, or a computing device having other form factors. The near-end signal 106 may include the speech of one or more users located proximate to the computing device capturing the audio content. The near-end signal 106 may also include background noise from the environment in which the computing device capturing the audio signals is located. The near-end signal 106 may also include components of the far-end signal 102 as discussed above. The far-end signal 102 may be output by a loudspeaker of the computing device capturing the near-end signal 106, and at least a portion of the far-end signal 102 output by the loudspeaker may be picked up by the microphone of the computing device. As discussed above, this situation can introduce a distracting audio echo. The model 100 utilizes AEC to remove and/or reduce these echoes.

The near-end signal 106 is provided as an input to the learnable encoder 108. The learnable encoder 108 operates similarly to the learnable encoder 104 and analyzes the near-end signal 106 to extract features from the near-end signal 106. In some implementations, the learnable encoder 108 is implemented as a 1D convolutional layer that is configured to extract linear features from the near-end signal 106. In some implementations, the filter and stride sizes of the learnable encoder 108 are equal to the window and hop sizes of a typical STFT configuration to reduce the computational costs associated with encoding of the near-end signal 106. The features output by the learnable encoder 108 are provided as an input to the alignment block 110.

The alignment block 110 is configured to handle non-aligned near-end signals 106 and far-end signals 102 in linear and non-linear echo path scenarios. The alignment block 110 receives the near-end features output by the learnable encoder 108 and the far-end features output by the learnable encoder 104 as input and uses attention to detect the alignment between the far-end signals and the echo-signals. A technical benefit of this approach is that this alignment information can then be used by the model 100 to remove the echo signals from the near-end signals 106. The output of the alignment block 110 is concatenated with the near-end features and projected to a smaller dimension, as in the original E3Net architecture. In some implementations, the alignment block 110 operates similarly to that described in detail in the paper "Deep model with built-in self-attention alignment for acoustic echo cancellation" by Indenbom, et al., which is incorporated herein by reference.

Figure 5:
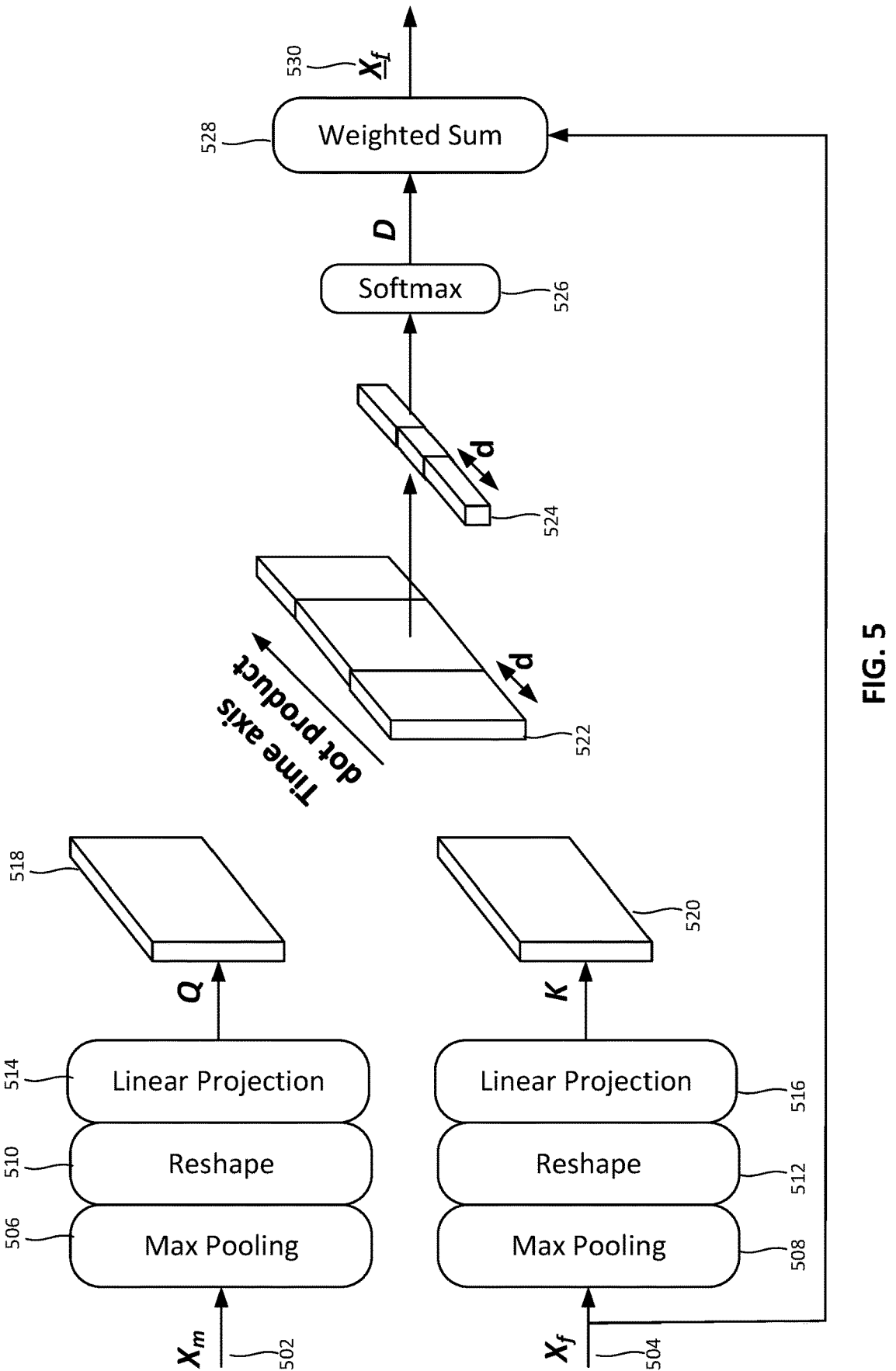
FIG. 5 is a diagram of an example alignment unit that may be used to implement the alignment unit in the preceding examples.

The alignment block 110 eliminates the need for a conventional alignment block that would be used with digital signal processing (DSP) algorithms, such as cross-correlation, by including a built-in self-attention module. The built-in self-attention module synchronizes the near-end signals 106 captured by the microphone and the far-end signals 102 in a latent space. Instead of a hard alignment of signals, the self-attention module performs soft alignment via attention, where multiple delay estimates are used. The use of such soft modeling improves the AEC quality and achieves good results in real-world scenarios. Furthermore, the low computational complexity, low inference time, and low latency associated with this approach allows the model 100 to be used in real-time applications. An example implementation of the alignment block 110 is shown in FIG. 5.

The concatenation block 112 concatenates the feature information extracted from the near-end signal 106 by the learnable encoder 108 with the attention information generated by the alignment block 110. The concatenated output is then provided as input to the projection layer 114, which is configured to project this input into a smaller number of dimensions.

Another modification to the E3Net architecture implemented in the architecture of the model 100 is dividing the Long Short-Term Memory (LSTM) blocks into multiple groups of LSTM blocks. In the example implementation shown in FIG. 1, the model 100 includes a first group of LSTM blocks 116 and a second group of LSTM blocks 122. The output from the projection layer 114 is provided as an input to the first group of LSTM blocks 116, which are configured to process the projected features. The first group of LSTM blocks 116 is trained to remove noise and echo signals. To achieve this, the first group of LSTM blocks 116 output whether a sample is noise, an echo, or includes human speech.

The second group of LSTM blocks 122 then analyze the projected features identified as human speech by the first group of LSTM blocks 116. The projected features output from the first group of LSTM blocks 116 are fused with the speaker embedding information 120 by the concatenation block 118.

The speaker embedding information 120 is a vector of features representing the characteristics of the target speaker or speakers. In some implementations, the speaker embedding information is represented by a d-vector of features extracted from audio of the target speaker or speakers captured during an enrollment process and analyzed using a deep neural network (DNN). Other implementations utilize other techniques for obtaining the speaker embedding information 120 for the target speaker or speakers. In some implementations, the communication platform and/or the client device is configured to obtain the speaker embeddings for participants and/or invitees of a communication session.

The speaker embedding information 120 is captured in a brief enrollment process in which speech generated by a target speaker is analyzed for features in some implementations. The enrollment process is implemented by a communication platform, such as the communication platform 725 shown in FIG. 7, or by a client device, such as the client devices 705a and 705 also shown in FIG. 7. In some implementations, the enrollment process is triggered when a user enables the joint acoustic echo cancellation (AEC) and personalized noise suppression (PNS) functionality for a particular communication session and/or for all communication sessions in which the user participates. During the enrollment process, the user records their speech using a user interface provided by the communication platform or the client device. In some implementations, the enrollment user interface presents the user with textual content to be read by the user, and the client device of the user records the records the user reading the textual content. The recording may be of a fixed length for each of the users. In a non-limiting example, the recording is 30 seconds long, and the user is prompted to read the textual content for 30 seconds and to repeat the text if necessary to fill the full 30 seconds. The communication platform or the client device analyze the recording using a DNN or other technique to generate the speaker embeddings 120 for the user. Each of the target speakers may perform this process so that PNS can be performed for those target speakers. The enrollment process in such implementations is typically a one-time process that is performed for each of the target speakers, and the client device and/or the communication platform stores this embedding information for future analysis.

In other implementations, the enrollment process does not rely the user reading provided textual content. Instead, the communication platform and/or the client device analyzes audio content from one or more communication sessions and extracts one or more audio segments that are likely to have been spoken by the user. The audio content may be analyzed using one or more machine learning or deep learning models configured to analyze audio content and to identify speakers within the audio content. The communication platform or the client device may then prompt the user to confirm that the extracted audio segments are the voice of the user. The extracted audio segments may then be analyzed by a DNN or using other such techniques to generate the speaker embedding information for the user. This approach may be utilized for multiple users.

The first group of LSTM blocks 116 do not have access to the speaker embedding information for identifying specific speakers. Instead, the second group of LSTM blocks 122 are utilized to remove interfering speaker information. As discussed above, an interfering speaker is another person who is present in the same environment as the target speaker and whose speech has also been captured in the microphone signal but whose speech interferes with the extraction of the speech of the target speaker or speakers.

The output of the concatenation block 118 is provided as an input to the projection layer 140, which is configured to project this input into a smaller number of dimensions. The projection layer 140 reduces the dimensionality of the features, the speaker embeddings, and the attention weights into a lower dimensional space to facilitate processing by the second group of LSTM blocks 122. In some implementations, the projection layer 140 contains a single, fully connected layer followed by non-linear activation and layer normalization, similar to the projection layer 114. The output of the projection layer 140 is provided as an input to the second group of LSTM blocks 122. The second group of LSTM blocks 122 is trained to utilize the speaker embedding information 120 to distinguish between target speakers whose speech and interfering speakers who were speaking in the background.

The mask prediction layer 124 estimates masks to be applied to the near-end features with element-wise multiplication at the multiplication block 126. In some implementations, the mask prediction layer 124 includes a fully connected layer with sigmoid non-linearity. The masks are used to mask the audio signals associated with interfering speakers. The output of the multiplication block 126 is provided as an input to the learnable decoder 128. The learnable decoder 128 outputs a clean audio signal 130.

The model 100 includes a bypass path 132. If the speaker embedding information 120 is empty, the model 100 uses the bypass path 132 to the mask prediction layer 124 and bypasses the second group of LSTM blocks 122. The second group of LSTM blocks 122 can be bypassed where there is no speaker embedding information that can be used to distinguish between the target speakers and interfering speakers. If the speaker embedding information 120 is not empty, the model 100 fuses the projected features and the speaker embedding and provides the fused features and speaker embedding to the second group of LSTM blocks 122.

Figure 2:
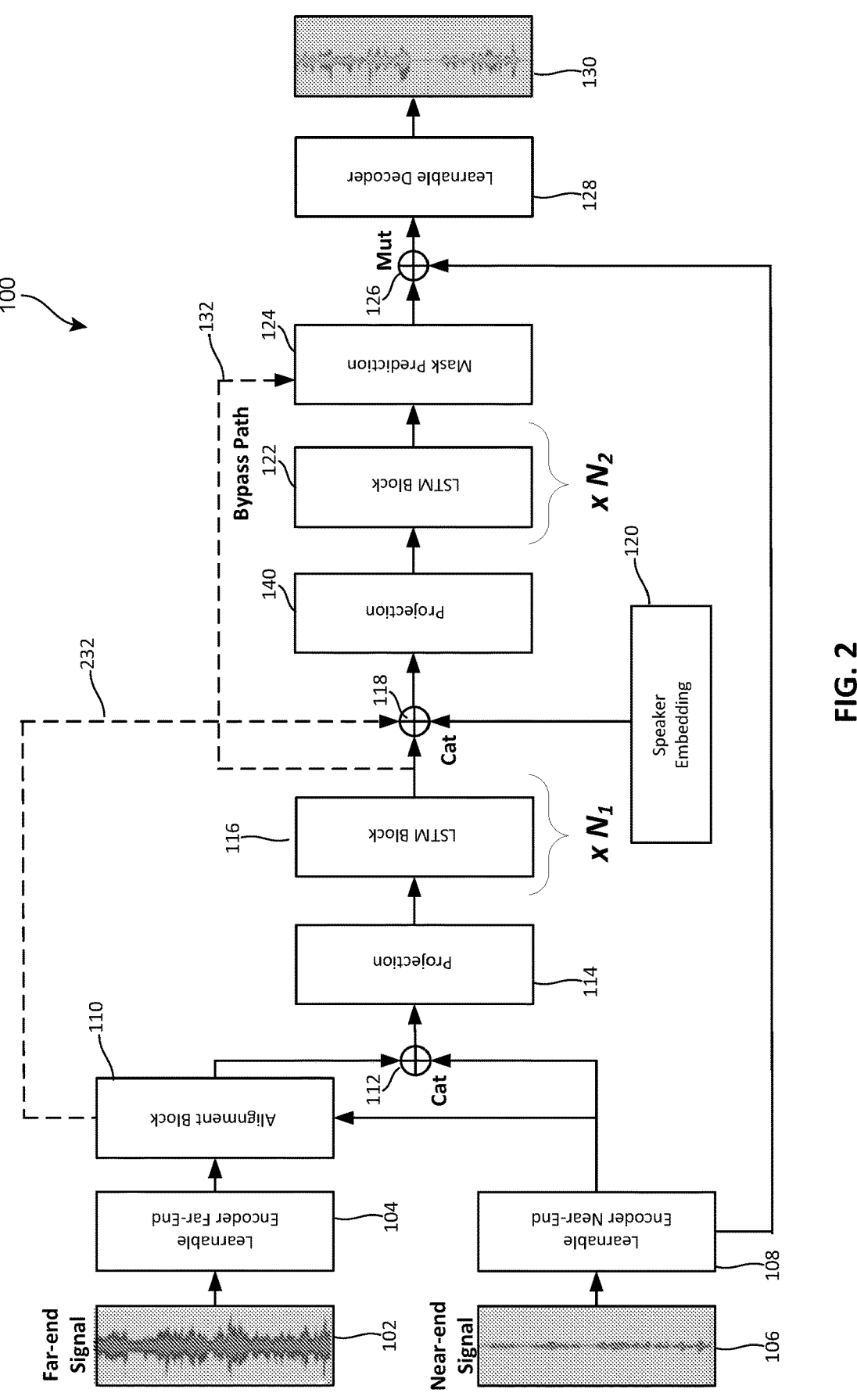
FIG. 2 is a diagram showing an alternative example implementation of the Joint AEC and PNS model shown in FIG. 1.

FIG. 2 is a diagram showing an alternative example implementation of the Joint AEC and PNS model shown in FIG. 1. In the example shown in FIG. 2, the attention weights 232 output by the alignment block 110 are provided as an additional input to the concatenation block 118. This approach can improve the performance of the model 100 by allowing the second group of LSTM blocks 122 to be aware of the presence of echo. The second group of LSTM blocks 122 can then remove any residual echo that could not be removed by the first group of LSTM blocks 116.

FIG. 3 is a diagram showing an alternative example implementation of the Joint AEC and PNS model shown in the preceding figures. In the implementation shown in FIG. 3, the LSTM blocks are divided into three groups instead of the two groups shown in the example implementations shown in FIGS. 1 and 2. In the example implementation shown in FIG. 3, the first group of LSTM blocks 311 and the second group of LSTM blocks 312 operate similarly to the first group of LSTM blocks 116 shown in FIGS. 1 and 2, in that the first two groups of LSTM blocks 311 and 312 do not use the speaker embeddings and use the shortcut to the mask prediction layer 124. The first group of LSTM blocks 311 removes the echo, and after processing the inputs, the output from the first group of LSTM blocks 311 is sent directly to the mask prediction layer 124. A first loss $L_1$ is computed at the output box 333, where the reference signal does not include the echo signal. The second group of LSTM blocks 312 removes background noise. The second group of LSTM blocks 312 does not use the speaker embeddings 120. A second loss $L_2$ is computed at the outbox 335 using a shortcut, where the reference does not contain echo and noise. The third group of LSTM blocks 322 utilizes the speaker embeddings 120. The third group of LSTM blocks 322 removes speakers who are not the target speaker. A third loss $L_3$ is calculated at outbox 340 using the speaker as a reference signal. The total loss L is calculated as $L=w_1 L_1 + w_2 L_2 + w_3 L_3$, where $w_1$ is a weight applied to the first loss $L_1$, $w_2$ is a weight applied to the second loss $L_2$, and $w_3$ is a weight applied to the second loss $L_3$. In some implementations, the weights applied in the loss function are determined empirically.

The example implementations shown in FIGS. 1-3 can be extended to accept multiple speaker embeddings to enable the speech from multiple speakers to be preserved rather than a single target speaker. In some implementations, the speaker embedding vectors are concatenated and fed into the network as a condition. In other implementations, the average of the speaker embedding vectors is determined and fed into the network as a condition. In yet other implementations, a source-target attention mechanism is used to calculate the weights for each of the embedding vectors for each time frame. These multi-speaker implementations may be used in instances in which multiple speakers join a communication session from a single device.

In some implementations, the example models shown in FIGS. 1-3 are trained using multiple batches of training data. In one example implementation, three successive batches of data are used to train the model. The first batch of training data trains the model 100 for AEC and noise suppression (NS) using the shortcut. The second batch of training data trains the model 100 for PNS. The third batch of training data is a combination of data similar to that included in the first and second batches of training data. The third batch of training data trains the model 100 for both AEC and PNS. The third batch of training data also improves the full-path AEC quality by exposing the later LSTM blocks to training samples which include non-zero echo signals.

The first batch of training data includes a mixture of data including target speaker data, noise, and echo data. Empty speaker embeddings are used for the first batch. Therefore, the network of the model 100 takes the bypass path 132 after the first group of LSTM blocks. The second batch of training data includes a mixture of target speaker, interfering speaker, and noise data. The second batch of training data includes speaker embedding vectors. In the second batch of training data, the far-end signal is all zeros so that there is no echo signal. Therefore, the network of the model 100 uses the second group of LSTM blocks. The third batch of training data contains a mixture of target speaker, interfering speaker, noise, and echo data. The third batch of training data also includes speaker embedding vectors. The model 100 uses the full path and trains the model to jointly perform PSE and AEC. This approach effectively implements a multi-task training for AEC and PNS.

Figure 4A:
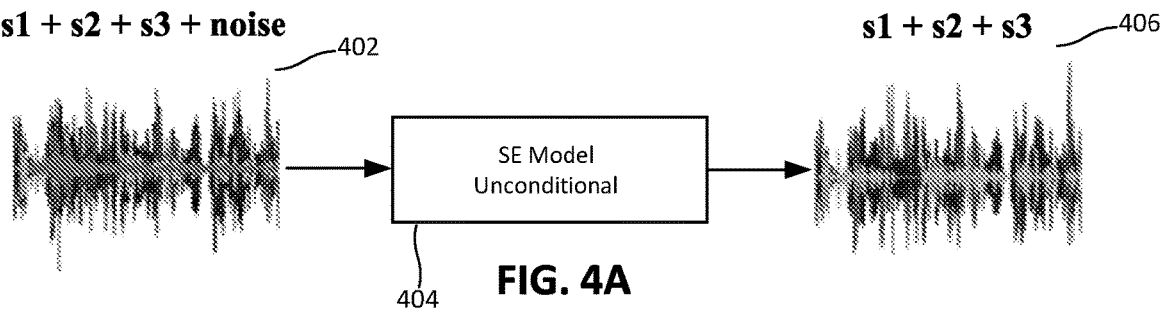
FIGS. 4A-4C are diagrams showing a comparison of unconditional speech enhancement and personalized speech enhancement.
Figure 4B:
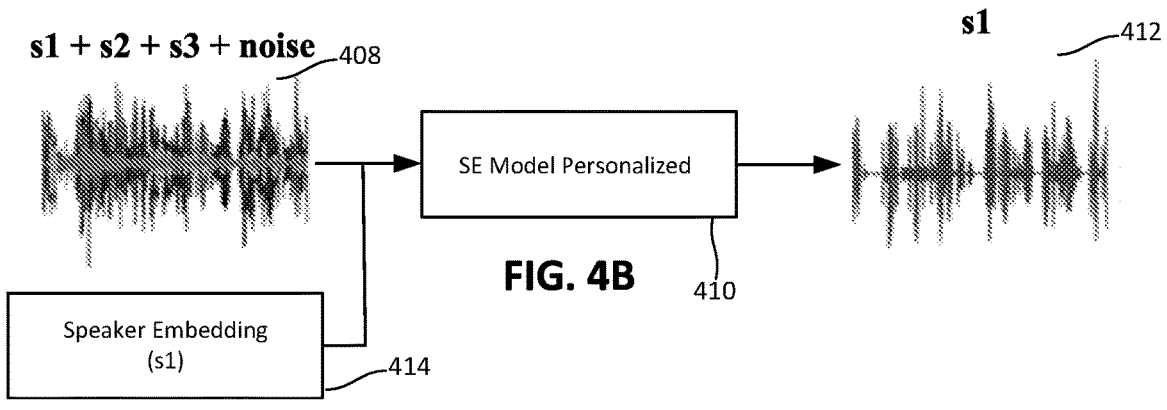
Figure 4C:
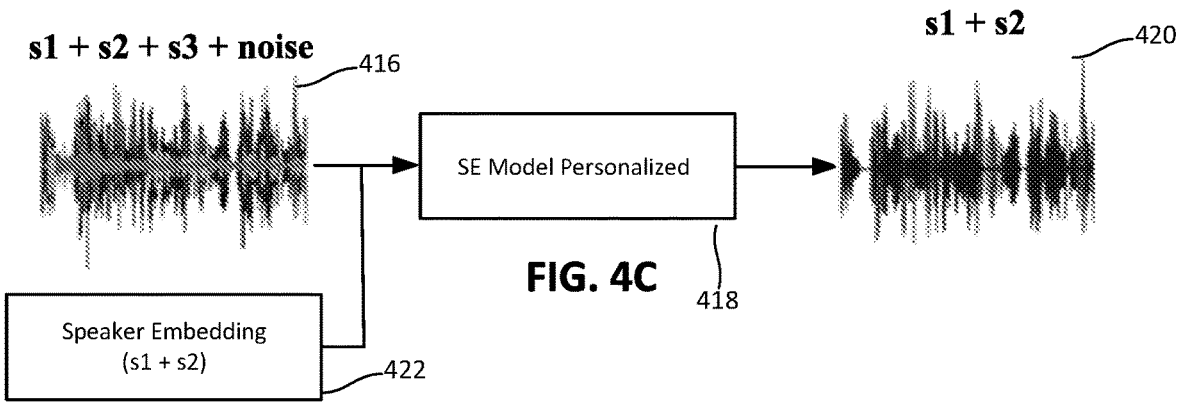

FIGS. 4A-4C are diagrams showing a comparison of unconditional speech enhancement and personalized speech enhancement. FIG. 4A shows an example of unconditional speech enhancement (SE) in which a source audio signal 402 includes the speech of three speakers s1, s2, and s3 and noise. The SE unconditional model 404 removes the noise and preserves the speech for the speakers s1, s2, and s3 in the audio output 406. An advantage of this approach is that the noise from the source audio signal 402 can be eliminated. However, a significant disadvantage of this approach is that the speech of all three speakers is preserved, regardless of the target speaker or speakers. Thus, if the speaker s1 is the target speaker and speakers s2 and s3 are interfering speakers, the speech of the interfering speakers s2 and s3 is also preserved.

FIG. 4B shows an example of a personalized SE model 410 with an input audio signal 408 including the speech of three speakers s1, s2, and s3 and noise. The personalized SE model 410 shown in FIG. 4B is configured to recognize and extract the speech associated with a single speaker, speaker s1. The model 410 receives the input audio signal 408 and speaker embeddings 414 for speaker s1 as an input. The speech of the speaker s1 is included in the audio output 412.

FIG. 4C shows an example of a personalized SE model 418 for multiple speakers. In this example implementation, the speaker embeddings 422 for speakers s1 and s2 are concatenated and fed into the network as a condition and the personalized SE model 418 extracts the speech associated with both speakers s1 and s2. The speech of speakers s1 and s2 is included in the audio output 420. In some implementations, the personalized SE model 418 is adapted for use with Automated Speech Recognition (ASR) using the multi-task training explained in the paper "Human Listening and Live Captioning: Multi-Task Training for Speech Enhancement" by Eskimez, et al.

FIG. 5 is a diagram of an example alignment unit that may be used to implement the alignment block 110 in the preceding examples. The alignment block shown in FIG. 5 is similar to that described in detail in the paper "Deep model with built-in self-attention alignment for acoustic echo cancellation" by Indenbom, et al.

In the example implementation shown in FIG. 5, $X_m \in \mathbb{R}^{c \times t \times f}$ represents microphone features 502 captured by a microphone of the near-end computing device. The microphone signal includes a near-end signal s, the background noise signal z, and echo signal e. $X_f \in \mathbb{R}^{c \times t \times f}$ represents the far-end features 504. The term c represents a channel dimension, t represents a time dimension, and f represents a frequency dimension of the features.

The feature maps 502 and 504 are first reduced with max-pooling layers 506 and 508, respectively, along the frequency dimension to reduce the computation cost brought by the alignment unit. In some implementations, the max-pooling layers 506 and 508 each have a kernel size of 1×4. Further, the features are reshaped by the reshaping units 510 and 512, respectively, such that $X_m' \in \mathbb{R}^{t \times (f/4c)}$ and $X_f' \in \mathbb{R}^{t \times (f/4c)}$. Next, the features are projected by the linear projection units 514 and 516, respectively, into queries 518 where $Q \in \mathbb{R}^{t \times p}$ and keys 520 where $K \in \mathbb{R}^{t \times p}$. The keys 520 tensor K is zero-padded at the beginning and cropped at the end with the same d value, generating a synthetic delay. Afterwards, a time axis dot product is determined by the dot product unit 522 for delayed K and Q. This procedure is computed for each delay index d from a specific interval, given by the maximum supported delay $d_{max}$, conducting to a result vector 524 of length $d_{max}$. The vector is further used in the softmax activation 526, predicting the most likely delay distribution $D \in \mathbb{R}^{d_{max}}$. Afterwards, the alighted far-end features $\underline{X}_f \in \mathbb{R}^{c \times t \times f}$ are computed by the weighted sum unit 528 through a weighted sum on the time axis with the corresponding delay probability from D. More exactly, the $X_f$ is delayed, multiplied with the corresponding weight factor from D and added to the final result 530 $\underline{X}_f$. Having a weighted sum rather than a hard selection improves the robustness to wrong delay estimations by allowing flat delay distributions.

FIG. 6A is a flow chart of an example process 600 for processing audio signals. The process 600 may be implemented by the models shown in FIGS. 1-3. The models may be implemented on a cloud-based communications platform and/or locally on one or more communications devices that participate in a communications session, such as the communication platform 725 or the client devices 705 shown in FIG. 7.

The process 600 includes an operation 605 of receiving a far-end signal associated with a first computing device participating in an online communication session. As discussed in the preceding examples, the far-end signal 102 can be obtained and analyzed to identify an echo signal that can be removed from the near-end signal 106.

The process 600 includes an operation 610 of receiving a near-end signal associated with a second computing device participating in the online communication session. The near-end signal 106 includes speech of a target speaker and a first interfering speaker. The near-end signal 106 also includes an echo signal. In some implementations, multiple target speakers may be identified and/or multiple interfering speakers may be identified. The speech of the interfering speakers occurs in the background and may overlap the speech of the target speaker or speakers. Capturing the speech of the interfering speakers raises privacy issues. Furthermore, including the speech of the interfering speakers can negatively impact the user experience by degrading audio content associated with a communication session and/or negatively impacting the quality of transcripts and/or other content derived from the audio content. As discussed in the preceding examples, echo are introduced when the far-end signal 102 is output by a loudspeaker of the computing device on the near-end and captured by a microphone of that computing device. Thus, the echo signal is present in the near-end signal 106 captured by the microphone of near-end computing device. Thus, the far-end signal 102 becomes the echo signal at the near-end.

The process 600 includes an operation 615 of providing the far-end signal, the near-end signal, and an indication of the target speaker as an input to a machine learning model. The machine learning model may be implemented by one of the example implementations shown in FIGS. 1-3. In contrast with current models which are configured to support either acoustic echo cancellation (AEC) or personalized noise suppression (PNS), the machine learning model is trained to analyze the far-end signal and the near-end signal to perform PNS to remove speech from one or more interfering speakers and AEC to remove echoes. The machine learning model is configured to output an audio signal comprising speech of the target speaker from which echoes and speech of interfering speakers has been removed.

The process 600 includes an operation 620 of obtaining the audio signal comprising the speech of the target speaker output by the machine learning model. The output of the model includes speaker specific audio content for one or more target speakers. This audio content may be provided to the computing devices of the one or more target speakers and/or to one or more other participants to a communication session. The audio content may also be provided to a communications platform facilitating an online communications session for further processing. For example, the communications platform may analyze the audio content to generate a transcript and/or other types of content from the audio content associated with a communication session.

FIG. 6B is a flow chart of an example process 630 for training a joint AEC and PNS model for processing audio signals. The process 630 may be used to train a joint AEC and PNS model, such as those shown in FIGS. 1-3. The process 630 may be implemented on a cloud-based communications platform and/or locally on one or more communications devices that participate in a communications session, such as the communication platform 725 or the client devices 705 shown in FIG. 7.

The process 630 includes an operation 635 of training a machine learning model using a first batch of training data to train the machine learning model to perform acoustic echo cancellation to remove echoes from an input audio signal. As discussed in the preceding examples, the joint AEC and PNS model using multiple batches of training data in some implementations. The first batch of training data trains the model for AEC and noise suppression.

The process 630 includes an operation 640 of training the machine learning model using a second batch of training data to train the machine learning model to perform personalized noise suppression to extract speech associated with a target speaker from the input audio signal. The second batch of training data trains the model for PNS. The second batch of training data includes a mixture of target speaker, interfering speaker, and noise data. The second batch of training data also includes speaker embedding vectors for the target speaker.

The process 630 includes an operation 645 of training the machine learning model using a third batch of training data to train the machine learning model to perform both AEC and PNS on the input audio signal. The third batch of data includes a mixture of target speaker, interfering speaker, noise, and echo data. The third batch of training data also includes speaker embedding vectors for the target speaker.

The process 630 includes an operation 650 of analyzing audio signals associated with a communication session using the machine learning model to remove echoes and to extract the speech of a target speaker participating in the communication session. The operation 690 is implemented using the process 600 shown in FIG. 6A in some implementations.

FIG. 6C is a flow chart of another example process 660 for processing audio signals. The process 670 may be implemented by the models shown in FIGS. 1-3. The models may be implemented on a cloud-based communications platform and/or locally on one or more communications devices that participate in a communications session, such as the communication platform 725 or the client devices 705 shown in FIG. 7.

The process 670 includes an operation 672 of receiving a far-end signal associated with a first computing device participating in an online communication session. As discussed in the preceding examples, the far-end signal 102 can be obtained and analyzed to identify an echo signal that can be removed from the near-end signal 106.

The process 670 includes an operation 674 of receiving a near-end signal associated with a second computing device participating in the online communication session. The near-end signal 106 includes speech of a target speaker and a first interfering speaker. The near-end signal 106 also includes an echo signal. In some implementations, multiple target speakers may be identified and/or multiple interfering speakers may be identified. The speech of the interfering speakers occurs in the background and may overlap the speech of the target speaker or speakers. Capturing the speech of the interfering speakers raises privacy issues. Furthermore, including the speech of the interfering speakers can negatively impact the user experience by degrading audio content associated with a communication session and/or negatively impacting the quality of transcripts and/or other content derived from the audio content. As discussed in the preceding examples, echo are introduced when the far-end signal 102 is output by a loudspeaker of the computing device on the near-end and captured by a microphone of that computing device. Thus, the echo signal is present in the near-end signal 106 captured by the microphone of near-end computing device. Thus, the far-end signal 102 becomes the echo signal at the near-end.

The process 670 includes an operation 676 of extracting first features from the near-end signal and second features from the far-end signal. The first features are a numerical representation of the near-end signal 106, and the second features are a numerical representation of the far-end signal 102. As shown in the preceding examples, the first features are extracted from the near-end signal 106 using the learnable encoder 108, while the second features are extracted from the far-end signal 102 using the learnable encoder 104. In other implementation, other feature extraction techniques are used to extract the feature information from the near-end signal 106 and the far-end signal 102.

The process 670 includes an operation 678 of determining alignment information by analyzing the first features and the second features. The alignment information represents a time offset between the first features and the second features resulting from difference in times at which the far-end signal 102 and the near-end signal 106 are received at the near-end computing device for processing. Synchronization of the far-end signal 102 and the near-end signal 106 are important for echo removal. In some implementations, the alignment information is determined using a deep learning architecture with built-in self-attention, such as the alignment block 110 described in the preceding examples. The alignment information includes time offset information in some implementations that enables portions of the far-end signal 102 and the near-end signal 106 to be synchronized. The time offsets may change over time due to various factors, including but not limited to network latency and processing latency introduced by the computing devices utilized at the near and far ends of the communication session.

The process 670 includes an operation 680 of generating human speech feature information by removing noise and echoes identified in the near-end signal based on the first feature information, the second feature information, and the alignment information. As discussed in the preceding examples, the echoes and noise may be first removed using AEC before applying PNS to extract the speech of the target speaker from the human speech included in the audio signals. In some implementations, the operation 680 is performed by the first group of LSTM blocks 116. Furthermore, in some implementations, the first feature information, the second feature information, and the alignment information are concatenated and the dimensionality of the concatenated information is reduced prior to being provided to the first group of LSTM blocks 116 as an input. The concatenation is performed by the concatenation block 112 in some implementations, and the projection layer 114 reduces the dimensionality of the output of the concatenation block 112 by projecting the concatenated information into fewer dimensions to facilitate analysis by the first group of LSTM blocks 116.

The process 670 includes an operation 682 of generating target speaker feature information by analyzing the human speech feature information to exclude speech from the first interfering speaker. The operation 682 includes performing PNS on the human speech information to exclude the speech from the first interfering speaker. While the example implementation shown in FIG. 6B includes a single target speaker and a single interfering speaker, other implementation include multiple target speakers and/or multiple interfering speakers. In some implementations, the second group of LSTM blocks 122 analyzes the human speech feature information output by the first group of LSTM blocks 116. In some implementations, the output of the first group of LSTM blocks 116 is concatenated with the speaker embeddings 120 and provided as an input to the projection layer 140. In some implementations the alignment information is also concatenated with the first group of LSTM blocks 116 and the speaker embeddings 120. The projection layer 140 reduces the dimensionality of the input by projecting the concatenated information into fewer dimensions to facilitate analysis by the second group of LSTM blocks 112.

The process 670 includes an operation 684 of decoding the target speaker future information to obtain an output audio signal comprising the speech of the target speaker. The feature embeddings generated from the near-end signal 106 and the far-end signal 102 were used to perform the AEC and PNS operations discussed above. These embeddings are converted back to an audio signal 130 that includes the speech of the target speaker. In some implementations, the learnable encoder 128 is used to convert the features of the speech if the target speaker into an audio signal. In some implementations, the mask prediction layer 124 masks the interfering speakers from the output of the second group of LSTM blocks 122 and the output of the mask prediction layer 124 is provided as an input to the learnable encoder 128.

Figure 7:
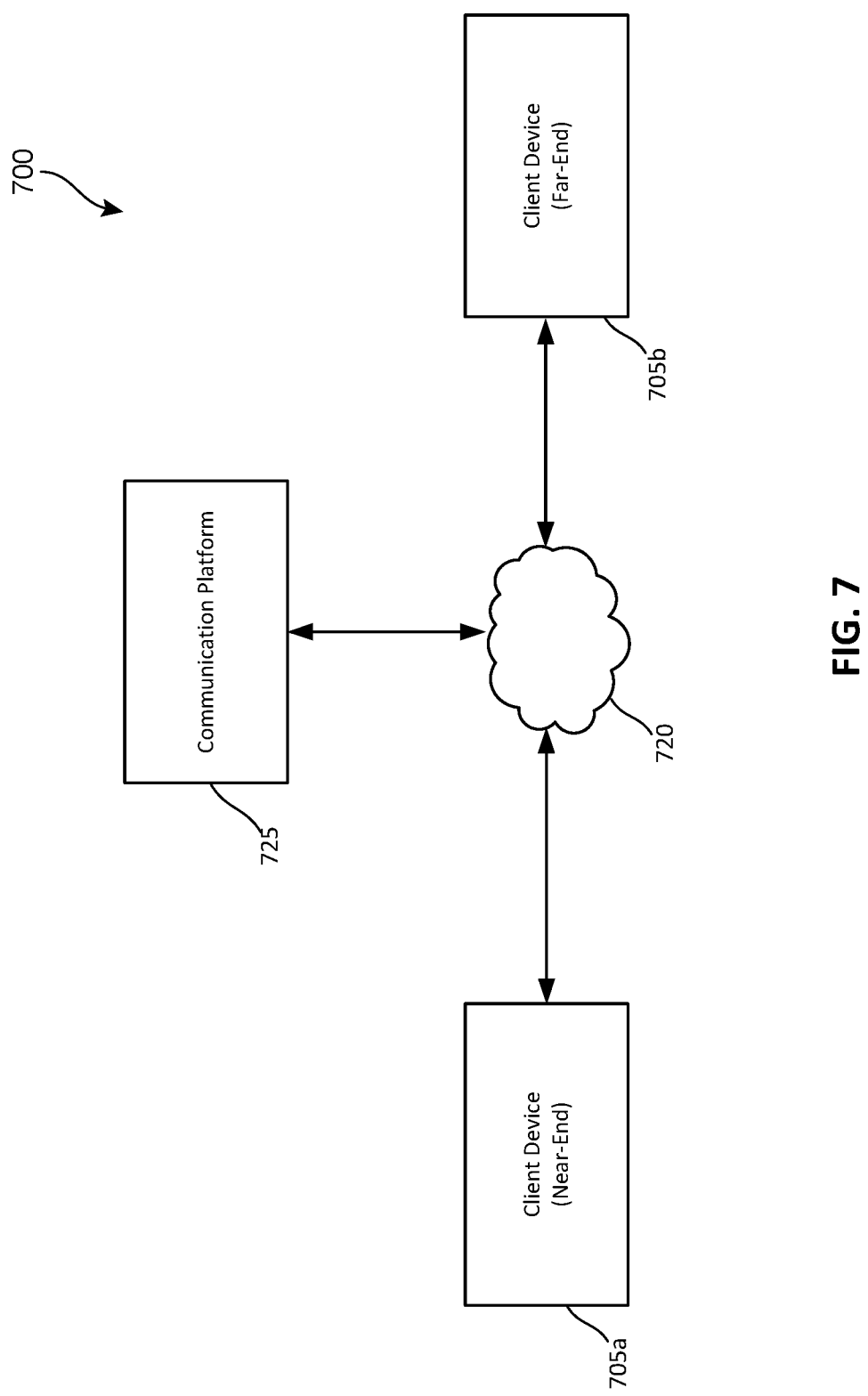
FIG. 7 is a diagram showing an example computing environment in which the techniques for joint AEC and PNS provided herein may be implemented.

FIG. 7 is a diagram showing an example computing environment 700 in which the techniques for joint AEC and PNS disclosed herein may be implemented. The computing environment 700 includes a communication platform 725 and a client devices 705a and 705b. The client devices 705a and 705b (collectively referred to as client device 705) communicate with the communication platform 725 via the network 720. The network 720 may be a combination of one or more public and/or private networks and may be implemented at least in part by the Internet.

In the example shown in FIG. 7, the communication platform 725 is implemented as a cloud-based service or set of services that facilitate full-duplex communications audio and/or video communication sessions. In some implementations, the communication platform 725 supports one or more of email, text messaging, chat messaging, and/or other types of messaging. In some implementations, the communication platform 725 also provides other services that are accessible to users via their respective client devices 705, such as but not limited to a collaboration platform which enables users to create and share electronic content. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to email message, text message, chat messages, word processing documents, presentations, websites (e.g., Microsoft SharePoint® sites), digital drawings, media files, components thereof, and the like.

The client devices 705a and 705b are each a computing device that may be implemented as a portable electronic device, such as a mobile phone, a tablet computer, a laptop computer, a portable digital assistant device, a portable game console, and/or other such devices. The client devices 705a and 705b may also be implemented in computing devices having other form factors, such as a desktop computer, vehicle onboard computing system, a kiosk, a point-of-sale system, a video game console, and/or other types of computing devices. While the example implementation illustrated in FIG. 7 includes two client devices, other implementations may include a different number of client devices that utilize the communication platform 725.

In the example implementation shown in FIG. 7, the client device 705a is the near-end computing device, and the client device 705b is the far-end computing device. The client device 705a captures a near-end signal, such as the near-end signal 106 discussed in the preceding examples, and the client device 705b captures a far-end signal, such as the far-end signal 102 discussed in the preceding examples. In some implementations, the various implementations of the joint AEC and PNS model shown in the preceding examples may be implemented on one of the client devices 705 on the communication platform 725. In implementations in which the joint AEC and PNS model are implemented by the communication platform 725, and the client device 705a sends the near-end signal 106 to the communication platform 725 via the network 720, and the client device 705b sends the far-end signal 102 to the communication platform 725 via the network 720. In in implementations in which the client device 705a implements the joint AEC and PNS model, the client device 705*a* receives the far-end signal 102 from the client device 705*b* via the network 720.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
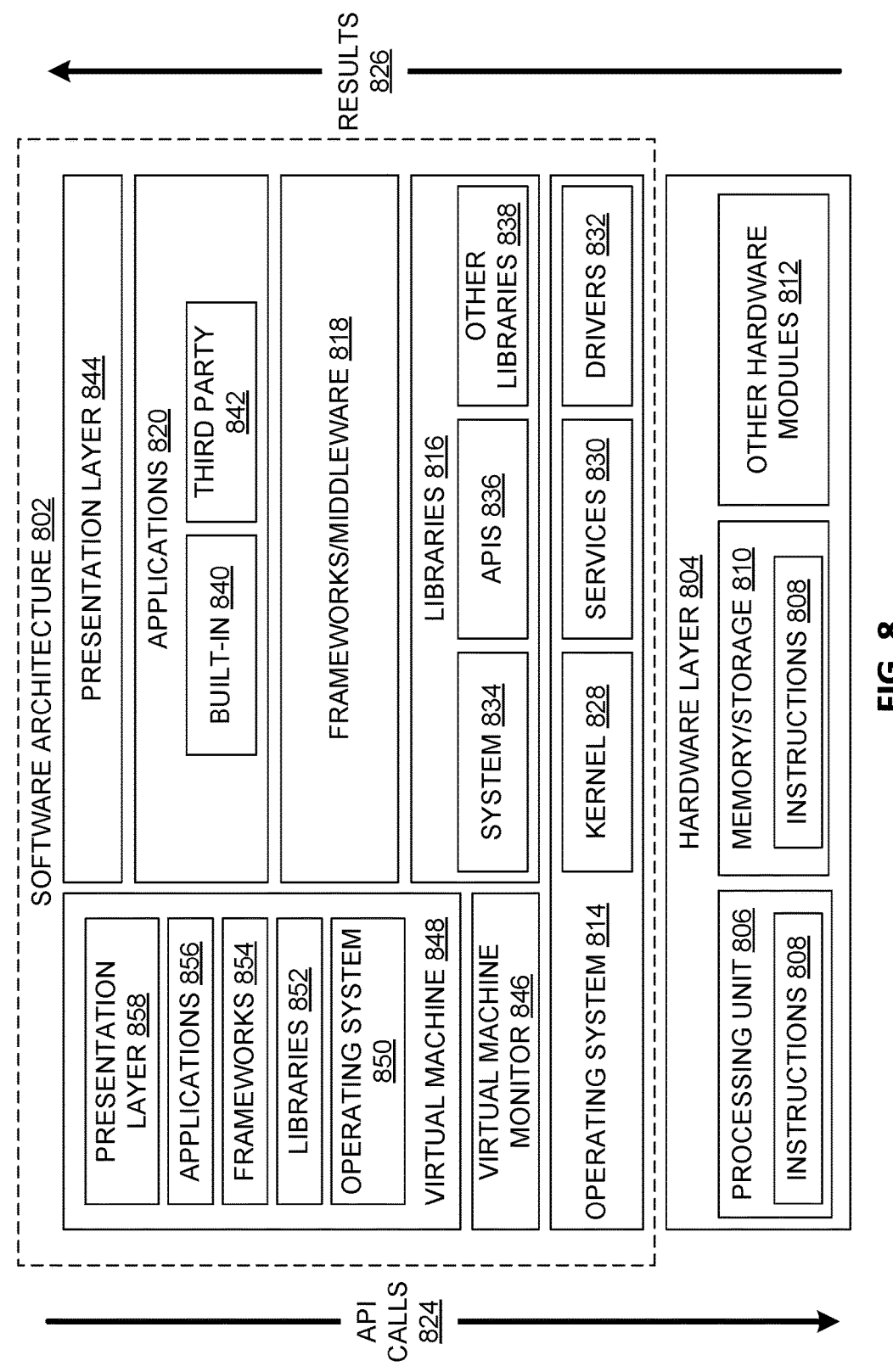
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
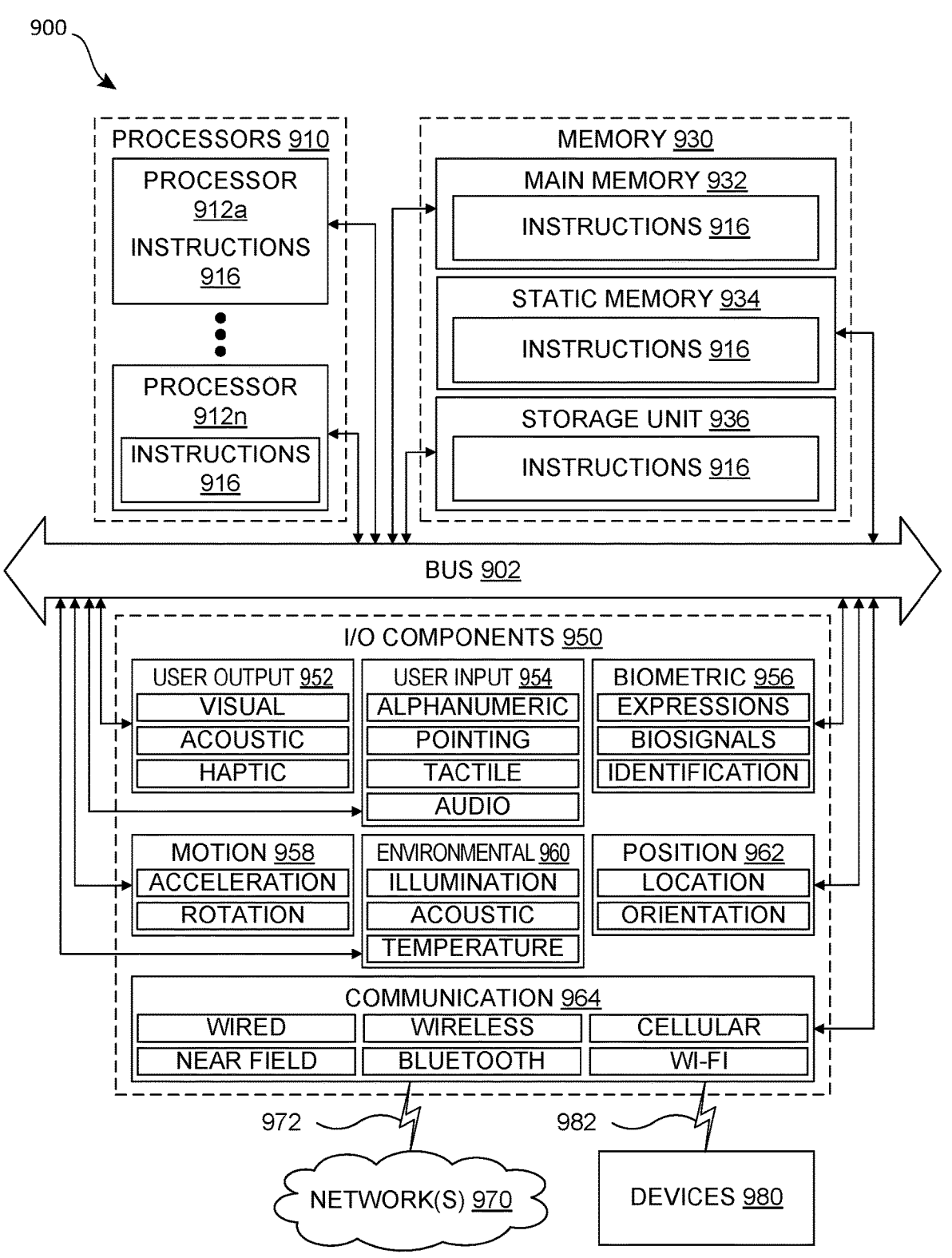
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
    receiving a far-end signal associated with a first computing device participating in an online communication session;
    encoding the far-end signal using a first learnable encoder to generate first embeddings representing first features of the far-end signal;
    receiving a near-end signal associated with a second computing device participating in the online communication session, the near-end signal including speech of a target speaker, one or more interfering speakers, and an echo signal;
    encoding the near-end signal using a second learnable encoder to generate second embeddings representing second features of the near-end signal;
    providing the first embeddings representing features of the far-end signal, the second embeddings representing features of the near-end signal, and an indication of the target speaker as an input to a machine learning model comprising:
        an alignment block, the alignment block configured to use attention to align the first features of the far-end signal included in the first embeddings and the second features of the near-end signal included in the second embeddings, the alignment block being further configured to output attention weights;
        a first concatenation block configured to concatenate the first embeddings, the second embeddings, and the attention weights into a first concatenated input,
        a first group of Long Short-Term Memory (LSTM) blocks trained to perform acoustic echo cancellation (AEC) on the first concatenated input to remove an echo and to output third features,
        a second concatenation block configured to concatenate the third features output by the first group of LSTM blocks and the attention weights output by the alignment block into a second concatenated input, and
        a second group of LSTM blocks trained to perform personalized noise suppression (PNS) on the second concatenated input to remove speech from one or more interfering speakers and to remove a residual echo output by the first group of LSTM blocks; and
    obtaining an audio signal comprising the speech of the target speaker from the machine learning model.

2. The data processing system of claim 1, wherein the indication of the target speaker comprises a target speaker embedding vector representing speech characteristics of the target speaker.

3. The data processing system of claim 2, wherein the machine-readable medium includes instructions configured to cause the processor to perform operations of:
    generating the target speaker embedding vector by capturing audio content comprising speech of the target speaker and extracting features from the audio content.

4. The data processing system of claim 2, wherein the second group of LSTM blocks receives the target speaker embedding vector as an input.

5. The data processing system of claim 1, wherein the machine-readable medium includes instructions configured to cause the processor to perform operations of sending the audio signal to the first computing device.

6. A method implemented in a data processing system for processing audio signals, the method comprising:

receiving a far-end signal associated with a first computing device participating in an online communication session;

encoding the far-end signal using a first learnable encoder to generate first embeddings representing first features of the far-end signal;

receiving a near-end signal associated with a second computing device participating in the online communication session, the near-end signal including speech of a target speaker, one or more first interfering speakers, and an echo signal;

encoding the near-end signal using a second learnable encoder to generate second embeddings representing second features of the near-end signal;

analyzing the first embeddings representing features of the far-end signal, the second embeddings representing features of the near-end signal, and an indication of the target speaker as an input to a machine learning model by:

aligning the first features of the far-end signal included in the first embeddings and the second features of the near-end signal included in the second embeddings using an alignment block configured to use attention to align the first features and the second features;

obtaining attention weights output by the alignment block in response to aligning the first features and the second features;

concatenating the first embeddings, the second embeddings, and the attention weights into a first concatenated input using a first concatenation block;

performing acoustic echo cancellation (AEC) on the first concatenated input using a first group of Long Short-Term Memory (LSTM) blocks to remove an echo and to output third features, concatenating the third features output by the first group of LSTM blocks and the attention weights output by the alignment block into a second concatenated input using a second concatenation block, performing personalized noise suppression (PNS) on the second concatenated input using a second group of LSTM blocks to remove speech from the one or more interfering speakers and to remove a residual echo output by the first group of LSTM blocks, and outputting an audio signal comprising speech of the target speaker; and obtaining the audio signal comprising the speech of the target speaker from the machine learning model.

7. The method of claim 6, wherein the indication of the target speaker comprises a speaker embedding vector representing speech characteristics of the target speaker.

8. The method of claim 7, further comprising generating the speaker embedding vector by capturing audio content comprising speech of the target speaker and extracting features from the audio content.

9. The method of claim 6, further comprising performing AEC on features extracted from the near-end signal to remove echoes from the near-end signal using the machine learning model.

10. The method of claim 9, further comprising aligning features of the near-end signal and features of the far-end signal using attention using an alignment block.

11. The method of claim 10, further comprising providing alignment information output by the alignment block as an input to the first group of LSTM blocks.

12. A data processing system comprising:

a processor; and a machine-readable medium storing executable instructions that, when executed, cause the processor to perform operations comprising:

training a machine learning model using a first batch of training data to train the machine learning model to perform acoustic echo cancellation (AEC) to remove echoes from an input audio signal;

training the machine learning model using a second batch of training data to train the machine learning model to perform personalized noise suppression (PNS) to extract speech associated with a target speaker from the input audio signal;

training the machine learning model using a third batch of training data to train the machine learning model to perform both AEC and PNS on the input audio signal; and analyzing audio signals associated with a communication session using the machine learning model to remove echoes and to extract the speech of a target speaker participating in the communication session by:

receiving a far-end signal associated with a first computing device participating in an online communication session;

encoding the far-end signal using a first learnable encoder to generate first embeddings representing first features of the far-end signal;

receiving a near-end signal associated with a second computing device participating in the online communication session, the near-end signal including speech of a target speaker, one or more interfering speakers, and an echo signal;

encoding the near-end signal using a second learnable encoder to generate second embeddings representing second features of the near-end signal;

analyzing the first embeddings representing features of the far-end signal, the second embeddings representing features of the near-end signal, and an indication of the target speaker as an input to a machine learning model by:

aligning the first features of the far-end signal included in the first embeddings and the second features of the near-end signal included in the second embeddings using an alignment block configured to use attention to align the first features and the second features;

obtaining attention weights output by the alignment block in response to aligning the first features and the second features;

concatenating the first embeddings, the second embeddings, and the attention weights into a first concatenated input using a first concatenation block;

performing acoustic echo cancellation (AEC) on the first concatenated input using a first group of Long Short-Term Memory (LSTM) blocks to remove the echo signal and to output third features, concatenating the third features output by the first group of LSTM blocks and the attention weights output by the alignment block into a second concatenated input using a second concatenation block, and performing personalized noise suppression (PNS) on the second concatenated input using a second group of LSTM blocks to remove speech from the one or more interfering speakers and to remove a residual echo output by the first group of LSTM blocks, and outputting an audio signal comprising speech of the target speaker.

13. The data processing system of claim 12, wherein the first batch of training data includes speech of the target speaker, noise data, and echo data.

14. The data processing system of claim 13, wherein the second batch of training data includes the speech of the target speaker, the speech of the one or more interfering speakers who are different than the target speaker, and the noise data.

15. The data processing system of claim 14, wherein the second batch of training data further includes echo data.

\* \* \* \* \*